US005822465A

United States Patent [19]

Normile et al.

[11] Patent Number: 5,822,465
[45] Date of Patent: Oct. 13, 1998

[54] IMAGE ENCODING BY VECTOR QUANTIZATION OF REGIONS OF AN IMAGE AND CODEBOOK UPDATES

[75] Inventors: James Oliver Normile, Sunnyvale; Katherine Shu-Wei Wang, San Jose, both of Calif.

[73] Assignee: Apple Computer, Inc., Cupertino, Calif.

[21] Appl. No.: 486,828

[22] Filed: Jun. 7, 1995

Related U.S. Application Data

[63] Continuation of Ser. No. 405,448, Mar. 15, 1995, Pat. No. 5,649,030, which is a continuation of Ser. No. 938,959, Sep. 1, 1992, abandoned.

[51] Int. Cl.⁶ ................................................. G06K 9/00
[52] U.S. Cl. .................................... 382/253; 382/239
[58] Field of Search ...................................... 382/232, 236, 382/238, 239, 240, 243, 253, 159, 160, 168, 170, 171, 172, 173, 175, 176, 180, 181, 190, 192, 195, 203, 209, 224, 235, 244, 248, 251, 252, 282, 286, 307, 308, 233, 234, 250, 274, 275; 358/425, 426, 427, 430, 433, 261.1, 261.2, 261.3; 375/241, 240; 341/65, 67, 106; 348/417, 422, 418

[56] References Cited

U.S. PATENT DOCUMENTS

| | | | |
|---|---|---|---|
| 4,733,298 | 3/1988 | Koga | 358/133 |
| 4,807,298 | 2/1989 | Conte et al. | 382/56 |
| 4,941,194 | 7/1990 | Shimura | 382/56 |
| 4,987,480 | 1/1991 | Lippman et al. | 358/13 |
| 5,046,119 | 9/1991 | Hoffert et al. | 382/56 |
| 5,068,723 | 11/1991 | Dixit et al. | 358/133 |
| 5,086,439 | 2/1992 | Asai et al. | 375/122 |
| 5,121,191 | 6/1992 | Cassereau et al. | 358/13 |
| 5,124,791 | 6/1992 | Israelsen et al. | 358/136 |
| 5,142,362 | 8/1992 | Masera et al. | 358/133 |
| 5,194,950 | 3/1993 | Murakami et al. | 358/136 |

(List continued on next page.)

FOREIGN PATENT DOCUMENTS 60-158788  8/1985  Japan .............................. H04N 7/137

OTHER PUBLICATIONS

Nasrabadi, et al., Interframe Hierarchical Address Vector Quantization, IEEE Journal on Selected Areas in Communications, vol. 10, No. 5 (Jun. 1992), pp. 960–967.

Supplementary Partial European Search Report (Aug. 9, 1995).

"A 500–800 bps Adaptive Vector Quantization Vocoder Using A Perceptually Motivated Distance Measure", D.B. Paul, IEEE Global Telecommunications Conference 1982, pp. 1079–1082.

Sun, H.F. and Goldberg, M. "Adaptive Vector Quantization For Image Sequence Encoding." In Proc. IEEE Int. Conf. Acoust., Speech, Signal Processing, Mar. 1985, pp. 339–342.

(List continued on next page.)

*Primary Examiner*—Leo H. Boudreau
*Assistant Examiner*—Bijan Tadayon
*Attorney, Agent, or Firm*—Blakely, Sokoloff, Taylor & Zafman

[57] ABSTRACT

Improved method and apparatus for vector quantization (VQ) to build a codebook for the compression of data. The codebook or "tree" is initialized by establishing N initial nodes and creating the remainder of the codebook as a binary codebook. Children entries are split upon determination of various attributes, such as maximum distortion, population, etc. Vectors obtained from the data are associated with the children nodes, and then representative children entries are recalculated. This splitting/reassociation continues iteratively until a difference in error associated with the previous children and current children becomes less than a threshold. This splitting and reassociating process continues until the maximum number of terminal nodes is created in the tree, a total error or distortion threshold has been reached or some other criterion. The data may then be transmitted as a compressed bitstream comprising a codebook and indices referencing the codebook.

58 Claims, 14 Drawing Sheets

U.S. PATENT DOCUMENTS

| | | | |
|---|---|---|---|
| 5,231,485 | 7/1993 | Israelsen et al. | 358/133 |
| 5,241,395 | 8/1993 | Chen | 358/261.3 |
| 5,278,647 | 1/1994 | Hingorani et al. | 358/136 |
| 5,313,534 | 5/1994 | Burel | 382/56 |

OTHER PUBLICATIONS

Gersho, A. and Yano, M., "Adaptive Vector Quantization By Progressive Codevector Replacement." In Proc. IEEE Int. Conf. Acoust., Speech, Signal Processing, 1985, pp. 133–136.

IEEE International Conference on Communications '86; "Integrating the World Through Communications", Jun. 1986, Sun, et al., Frame Adaptive Vector Quantization, pp. 1878–1882, vol. 3.

Nasrabadi, N. M. and King, R.A. "Image Coding Using Vector Quantization: A Review." *IEEE Trans. Commun.*, vol. COM–36, pp. 957–971 (Aug. 1988).

Gray, R. M. "Vector Quantization." *IEEE ASSP Mag.*, vol. 1, pp. 4–29 (Apr. 1984).

Goldberg, M. and Sun, H. "Image Sequence Coding Using Vector Quantization." Reprinted from *IEEE Trans. Commun.* vol. COM–34, pp. 703–710 (Jul. 1986).

Buzo, A., Gray, A., Jr., Gray, R. and Markel, J. "Speech Coding Based Upon Vector Quantization." *IEEE Trans. on ASSP.*, vol. ASSP–18 pp. 562–574 (Oct. 1980).

Chang, R.F. and Chen, W. T. "A Fast Finite–State Codebok Design Algorithm for Vector Quantization." Visual Communications and Image Processing '91: Visual Communication, Boston, MA, 11–13 Nov. 1991, vol. 1605, pt. 1, in *Proceedings of the SPIE—The International Society for Optical Engineering*, 1991, USA, pp. 172–178.

Jung, H. M. and Lee, C. W. "Adaptive Vector Quantization Based Upon the Update of a Codebook for Image Sequence Coding." *Transactions of the Institute of Electronics, Information and Communication Engineers E*, vol. E73, No. 9 (Sep. 1990), Japan, pp. 1493–1502.

Linde, Y., Buzo, A., and Gray, R. "An Algorithm for Vector Quantizer Design." *IEEE Transactions on Communications*, vol. COM–28, No. 1, (Jan. 1980), USA, pp. 84–95.

Gersho, A. and Gray, R. M. *Vector Quantization and Signal Compression*. Kluwer Academic Publishers, Second Printing, 1993. pp. vii–xi, 407–485.

| Sequence header ID | 1101 |
|---|---|
| Bytes in sequence header | 1102 |
| Number of frames | 1103 |
| Reserved | 1104 |
| Width | 1105 |
| Height | 1106 |
| Version | 1107 |

| Width | 1201 |
|---|---|
| Height | 1202 |
| Frame type | 1203 |
| Subsampled zones | 1204 |

- 1012 (or 1014)
- Codebook type 1301
- Length 1302

FIG. 13b 1013 (or 1015) for update case

- Bitmap of which codebook indices to update (32 bytes) 1370
- Codebook vector update 1 (6 bytes) 1371
- Codebook vector update 2 (6 bytes) 1372
- ...
- Codebook vector update N (6 bytes) 1373

- Blockheader: 8-2x2C 1401
- CB Index, ..., CB Index — 8 Indices 1402
- Blockheader: 5-4x4NC 1410
- Blockheader: 10-4x4SS 1420
- CB Index, CB Index, ..., CB Index — 10 Indices 1421

IMAGE ENCODING BY VECTOR QUANTIZATION OF REGIONS OF AN IMAGE AND CODEBOOK UPDATES

This is a continuation of application Ser. No. 08/405,448, filed Mar. 15, 1995 now U.S. Pat. No. 5,649,030 which is a continuation of application Ser. No. 07/938,959, filed Sep. 1, 1992, now abandoned.

BACKGROUND OF THE INVENTION

1. Field of the Invention

The present invention relates to video compression and decompression. More specifically, the present invention relates to improved video compression/decompression using image preprocessing and vector quantization (VQ).

2. Background of Related Art

Modern applications, such as multimedia or other applications requiring full motion video required the development of video compression standards for reducing the processing bandwidth consumed by storing, transmitting, and displaying such video information. This is due to the large amount of data to transmit or store for representing high resolution full image video information. Generally, apparatus such as shown in FIGS. 1a, 1b, and 1c are employed in order to conmpress and decompress an input image for vector quantization based techniques. For instance, as shown in FIG. 1a, an image 100 may be input to an encoder 101 which applies spatial or temporal preprocessing to an input image or sequence of images in order to reduce the redundancy or otherwise reduce the amount of information contained in the input image 100. Encoder 101 generates a compressed image 102 which is substantially smaller than the original image 100. In certain prior art systems, the encoder 101 uses a codebook 105 which is used for matching given pixel patterns in the input images 100, so that the pixel patterns are mapped to alternative pixel patterns in the compressed images 102. In this manner, each area in the image may be addressed by referencing an element in the codebook by an index, instead of transmitting the particular color or other graphics information. Although in some prior art applications, quality is lost in compressed images 102, substantial savings are incurred by the reduction in the image size from images 100 to compressed images 102. Other compression techniques are "loss-less" wherein no quality in the decoded images is lost generally at the cost of additional computation time or a larger bitstream.

Conversely, compressed images 102 may be applied to a decoder 131, as shown in FIG. 1b, in order to generate decompressed images 132. Again, decoder 131 uses codebook 105 to determine the pixel patterns represented in images 132 from the indices contained within compressed images 102. Decoder 131 requires the use of the same codebook 105 which was used to encode the image. Generally, in prior art systems, the codebook is unique as associated with a given image or set of images which are compressed and/or decompressed for display in a computer system.

Generally, a codebook such as 105 is generated from image or training set of images 151 which is applied to a codebook generator 152. The codebook can be generated specifically from and for one or more images that are compressed, and that codebook is used for decoding the images it was generated from. The codebook can also be generated once by optimizing it for a long training sequence which is meant to be a reasonable representation of the statistics of sequences of images to be coded in the future. This training codebook is meant to be representative of a large range of image characteristics. The training codebook is often fixed at the encoder and decoder, but pieces of the codebook may also be improved adaptively. In some prior art schemes, codebook generator 152 and encoder 101 are one in the same. Encoding is performed simultaneous with codebook generation, and the codebook is derived from the encoded image(s) instead of training image(s).

FIG. 2 shows how an image 200 may be partitioned to discrete areas known as vectors for encoding and decoding of the image. In one prior art approach, an image such as 200 is divided into a series of 2×2 pixel blocks such as 201 and 202 which are known as "vectors." Each of the vectors such as 201 comprises four pixels 201a, 201b, 201c, and 201d. When an image has been broken down into such vectors, each of the vectors in the bitstream may be used to: (a) encode an image which may include generating a codebook; and (b) decode an image. Each of the vectors such as 201, 202, etc. in image 200 may be used to represent image 200. Thus, an image may be represented by references to elements in a codebook which each are approximations of the vectors contained in the image. Thus, instead of representing the image by using four discrete pixels such as 201a through 201d, the image may be represented by referencing a codebook index which approximates information contained in vector 201. Depending on the number of entries in the codebook, using the codebook index to refer to an image vector can substantially reduce the storage required for representing the vector because the actual pixel values 201a–201d are not used to represent the image.

Such prior art apparatus, such as discussed with reference to FIGS. 1a through 1c, are implemented in a device known is a codec (coder/decoder) which generates a compressed bitstream for a sequence of images from the corresponding codebook, and uses the codebook to decompress the images at a later time. For example, such a codec is shown as apparatus 300 in FIG. 3. Codec 300 comprises two sections: encoder 301 and decoder 351. Encoder 301 accepts as input data 310, which may be video, sound, or other data which is desired to be compressed. For the purposes of the remainder of this application, a discussion of video encoding/decoding will ensue, however, it can be appreciated by one skilled in the art that similar schemes may be applied to other types of data. Such input data may be applied to a preprocessor 320 wherein certain parameters are adjusted to preprocess the data in order to make encoding/decoding an easier task. Preprocessor 320 then feeds into a vector quantizer 330 which uses vector quantization to encode the image in some manner, which equivalently reduces redundancies. Then, vector quantizer 330 outputs to a packing/coding process 340 to further compress the bitstream. A rate control mechanism 345 receives information about the size of the compressed bitstream 350, and various parameters are adjusted in preprocessor 320 in order to achieve the desired datarate. Moreover, preprocessor 320 samples the encoded data stream in order to adjust quality settings.

Codec 300 further includes a decoder 351 which receives and decodes the compressed bitstream 350 by using a codebook regenerator 360. The decoder in the encoder need not go through the packing 340 or unpacking 370 process in order to decode the image. In the decoder, codebook regenerator 360 is fed into an unpacking process 370 for restoring the full bitstream. The results of this process may be passed to a postfilter 375 and then dithering 380 may be performed upon the image, and finally the image is displayed, 390.

Examples of prior art vector quantization processes may be found in the reference: Gray, R. M., "Vector Quantization," 1 *IEEE ASSP Magazine*, 4–29 (April 1984) ("Gray"), and Nasrabadi, N. M., "Image Coding Using Vector Quantization: A Review," COM-36 *IEEE Transaction on Communications*, 957–971 (August 1988) ("Nasrabidi"). Such vector quantization includes the creation of a tree searched vector quantizer which is described in Gray at pp. 16–17, and in Nasrabadi at p. 75.

The codebook generation process is iterative and tends to be computationally expensive. Thus, in some prior art methods, which require a codebook per frame, the encoding tends to be slow. Also, a drawback to prior art systems which use training sequences is quality, which may not be acceptable for many sequences which may not be similar to image(s) in the training sequence. Overall performance is also a concern. Some prior art techniques require an inordinate amount of processing and still do not achieve acceptable compression while not being able to perform the compression in real-time. Demands for fast decoding capability are often even more stringent or real time playback is not possible. Most prior art systems also have a computationally expensive decoder.

SUMMARY AND OBJECTS OF THE INVENTION

One of the objects of the present invention is to provide an apparatus and method for efficiently generating codebooks by vector quantization, reducing spatial and temporal redundancy in images, and associated processing of images in order to conserve bandwidth of the compression system.

Another of the objects of the present invention is to provide a means for efficiently partitioning and processing an image in order to reduce the errors associated with typical prior art vector quantization techniques.

Another of the objects of the present invention is to provide a means for further reducing the computation associated with typical prior art vector quantization techniques.

Another of the objects of the present invention is to provide a means for efficiently and effectively controlling the resulting datarate of a compressed sequence in order to accommodate smooth playback over limited bandwidth channels.

Another of the objects of the present invention is to provide a simple decode structure which will allow real time decoding of the compressed data.

These and other objects of the present invention are provided for by an improved method and apparatus for vector quantization (VQ) to build a codebook for the compression of data. In one embodiment, the data comprises image data. The codebook "tree" is initialized by establishing N initial nodes and creating the remainder of the codebook as a binary codebook. Children entries are split upon determination of various attributes, such as maximum distortion, population, etc. Vectors obtained from the data are associated with the children nodes, and then representative children entries are recalculated. This splitting/reassociation continues iteratively until a difference in error between previous children and current children becomes less than a threshold. This splitting and reassociation continues until the maximum number of terminal nodes is created in the tree, a total error or distortion threshold has been reached or some other criterion. The data may then be transmitted as a compressed bitstream comprising a codebook and indices referencing said codebook.

BRIEF DESCRIPTION OF THE DRAWINGS

The present invention is illustrated by way of example and not limitation of the figures of the accompanying in which like references indicate like elements and in which:

FIGS. 11–16 show detailed views of the data contained in the bitstream discussed with reference to FIG. 10.

DETAILED DESCRIPTION

The present invention is related to improved methods of vector quantization. In the following description, for the purposes of explanation, specific types of data, applications, data structures, pointers, inidices, and formats are set forth in order to provide a thorough understanding of the present invention. It will be apparent, however, to one skilled in the art, that the present invention may be practiced without these specific details. In other instances, well-known structures and data are shown in block diagram form in order to not unnecessarily obscure the present invention.

Figure 1A:
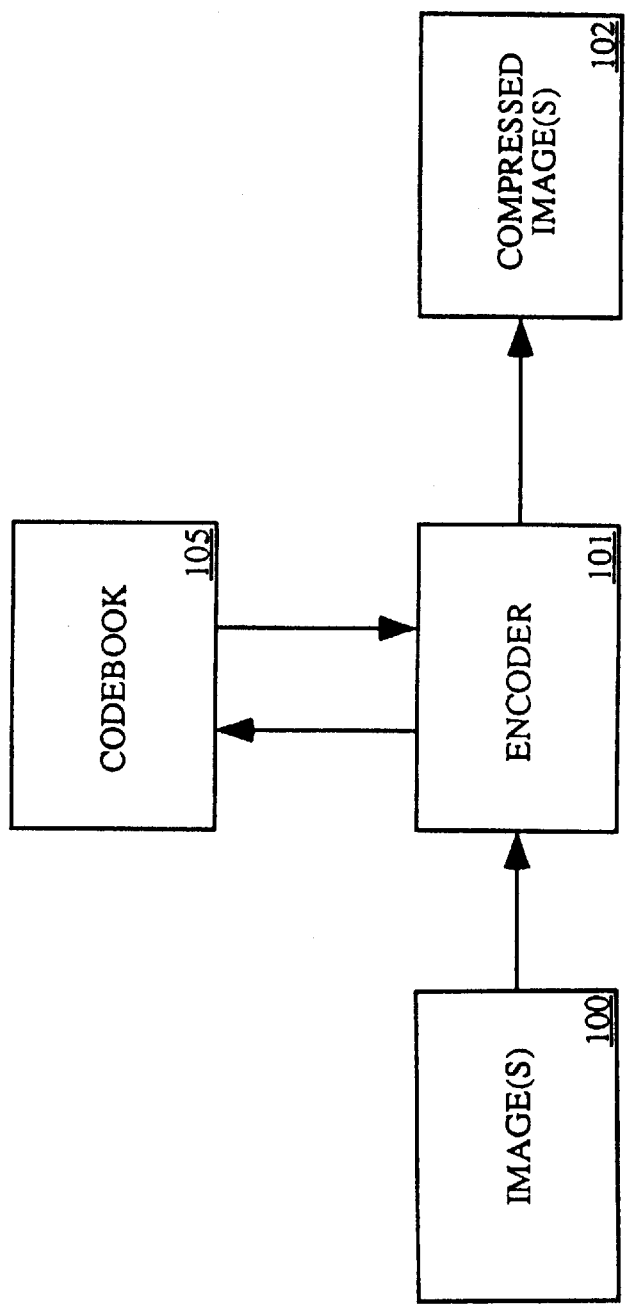
FIGS. 1*a*–1*c* show prior art encoding/decoding apparatus used for compressing/decompressing video image(s).
Figure 1B:
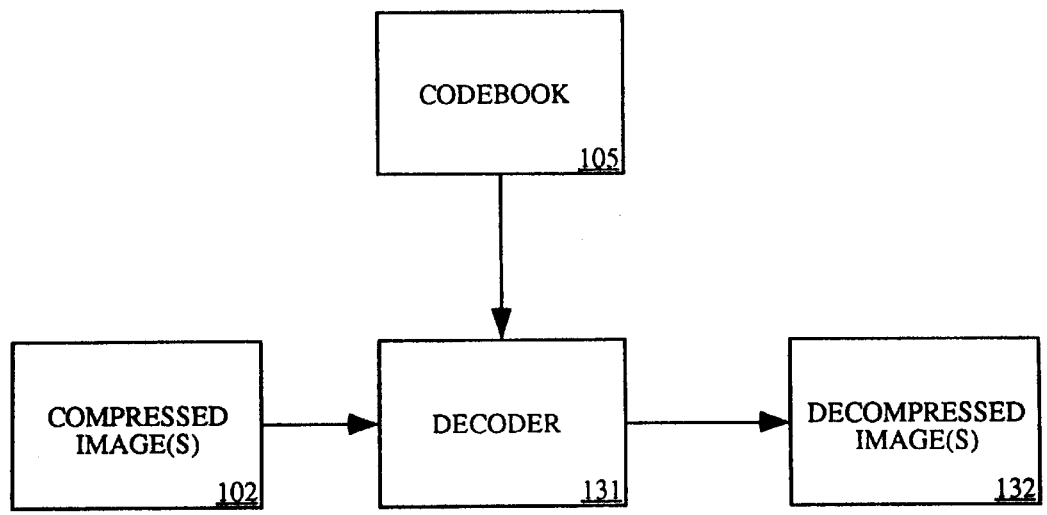
Figure 1C:
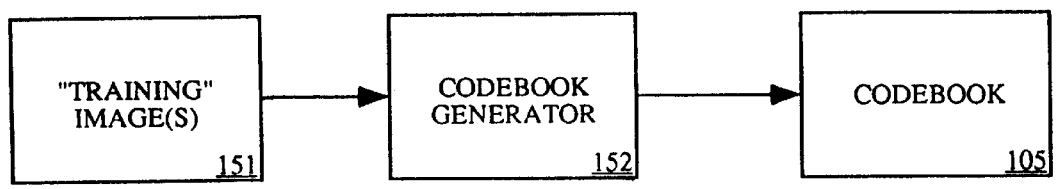
Figure 2:
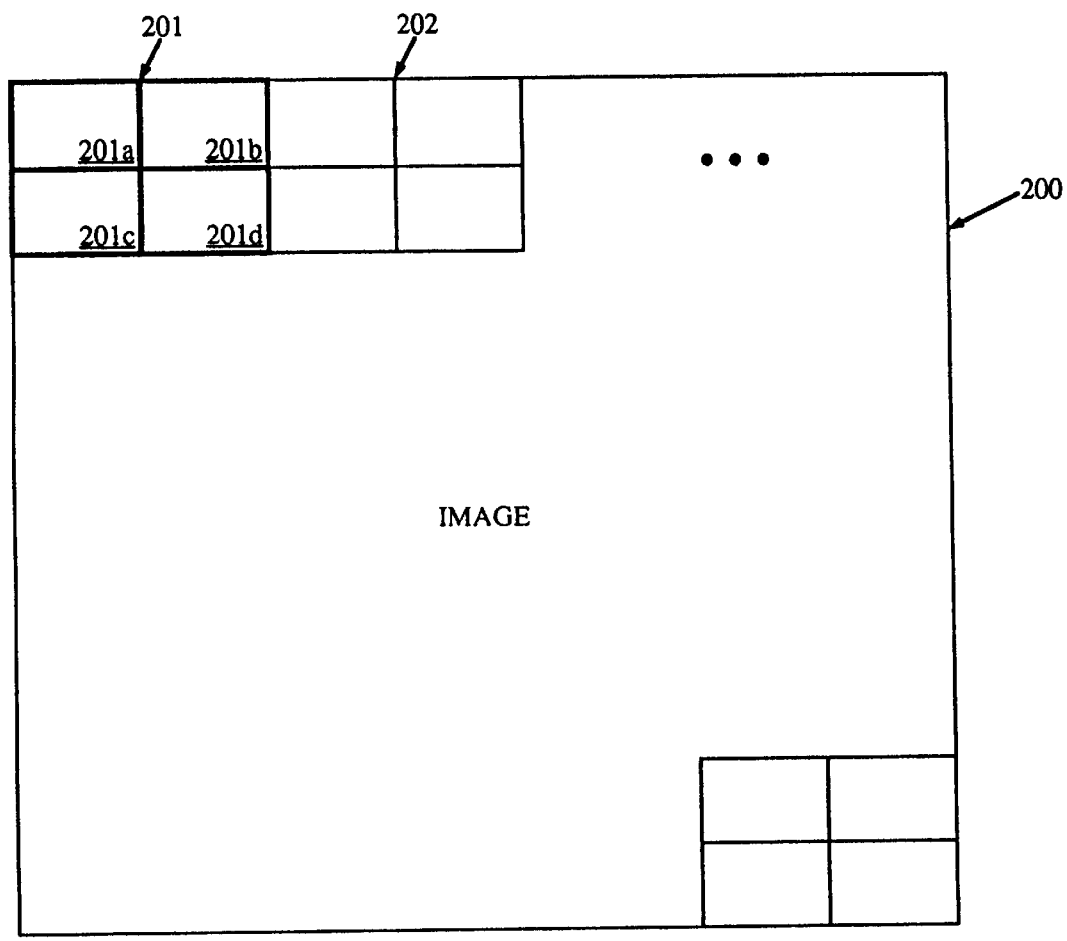
FIG. 2 shows a prior art scheme for dividing an image into vectors comprising 2×2 pixel blocks.
Figure 3:
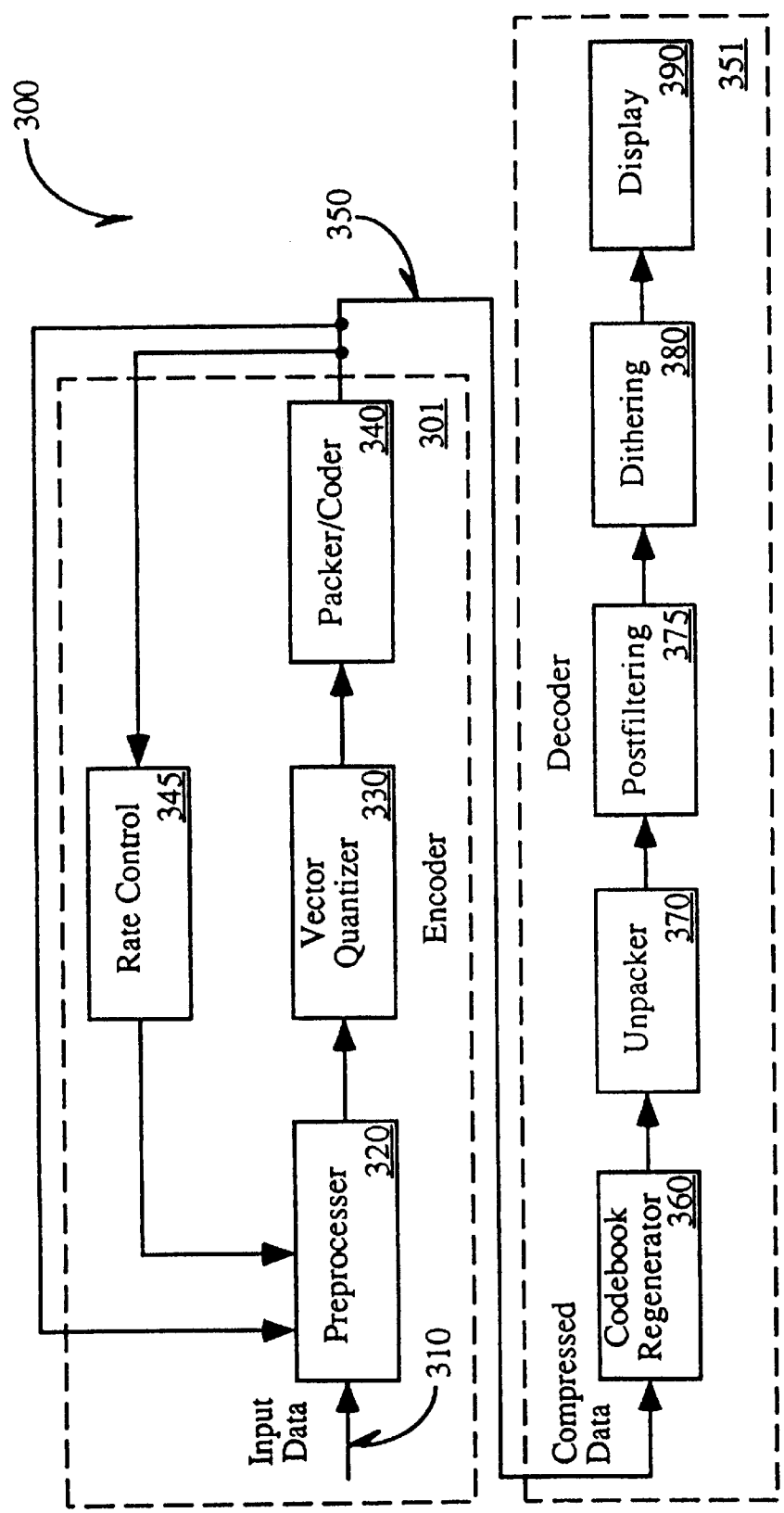
FIG. 3 shows a functional block diagram of a prior art codec (coder/decoder).

The preferred embodiment of the present invention is structured in a similar manner as shown in the prior art codec as 300 in FIG. 3. These may be implemented in a general purpose programmed computer system which includes a display, a processor and various static and dynamic storage devices. This also may include a special purpose video coder or decoder which is designed to provide for special purpose applications. Of course, it can be appreciated by one skilled in the art that the methods and apparatus of the preferred embodiment may be implemented in discrete logic devices, firmware, an application specific integrated circuit (ASIC) or a programming logic array as is suited to an application's requirements.

The preferred embodiment is implemented in a high level programming language such as the "C" programming language and run in a general purpose computer system. The routines written to implement the preferred embodiment are compiled and assembled into executable object code which may be loaded and run by a processor of such system during system runtime.

Note that, although the discussion of the present invention has been described specifically with reference to video information, the techniques and apparatuses discussed here also have equal application to other areas which utilize vector quantization, such as in the audio field, and the specific discussion of video information in this application should not be viewed as limiting the present invention.

PREPROCESSING

The data rate at the output from the codec is used to control the amount of information which is allowed to reach the vector quantization process via the preprocessor 320. This is done at two levels—global and local. Global changes to the spatial resolution are made by applying a lowpass input filter to the input image, which changes the bandwidth of the image. The passband width of this filter varies with the error in the required data rate. As the error decreases, the bandwidth of the input filter increases allowing more information to reach the codec. Conversely as the error in desired data rate increases, the input filters bandwidth decreases, limiting the information which reaches the codec. Global changes to the temporal resolution are made by determining the difference between curent and previous frames. If the change is below a threshold, then the current frame is skipped. The threshold is determined from the data rate error. Another global mechanism by which the temporal bandwidth is reduced is by extending the definition of error between two frames to allow a transformation on the frame prior to the error calculation. Such transformations include but are not limited to pan and zoom compensation.

The local control of the amount of information which is allowed to reach the vector quantization process includes spatial subsampling and temporal blocks (or more generally, the local determination of motion compensated blocks). The system of the preferred embodiment implements an improved vector quantizer as shown as 330 in FIG. 3, which is very efficient at producing a small set of representative image vectors, referred to as the codebook, from a very large set to vectors, such as an image to be encoded. The image(s) reconstructed by decoder 351 from the codebook generated by such a vector quantizer will be close to the original in terms of some criterion. The performance of the overall compression/decompression scheme is further improved in the preferred embodiment by controlling the content of the bitstream prior to vector quantizer 330 by a preprocessor 320. This preprocessing can be transparent to vector quantizer 330. Preprocessor 320 substantially reduces the amount of information used to code the image with a minimum loss of quality. Tags are used in the preferred embodiment to designate vectors that don't change in time instead of coding them. These are known as "no-change" blocks because they don't change according to some threshold. Blocks are also processed using spatial subsampling in the preferred embodiment to achieve better compression. Further, preprocessor 320 can also change the characteristics of the image space in order to increase speed or to improve quality, such as by performing a transformation from an encoding represented in red, green and blue (RGB) to an encoding represented using luminance and chrominance (YUV).

NO-CHANGE BLOCKS

Figure 4:
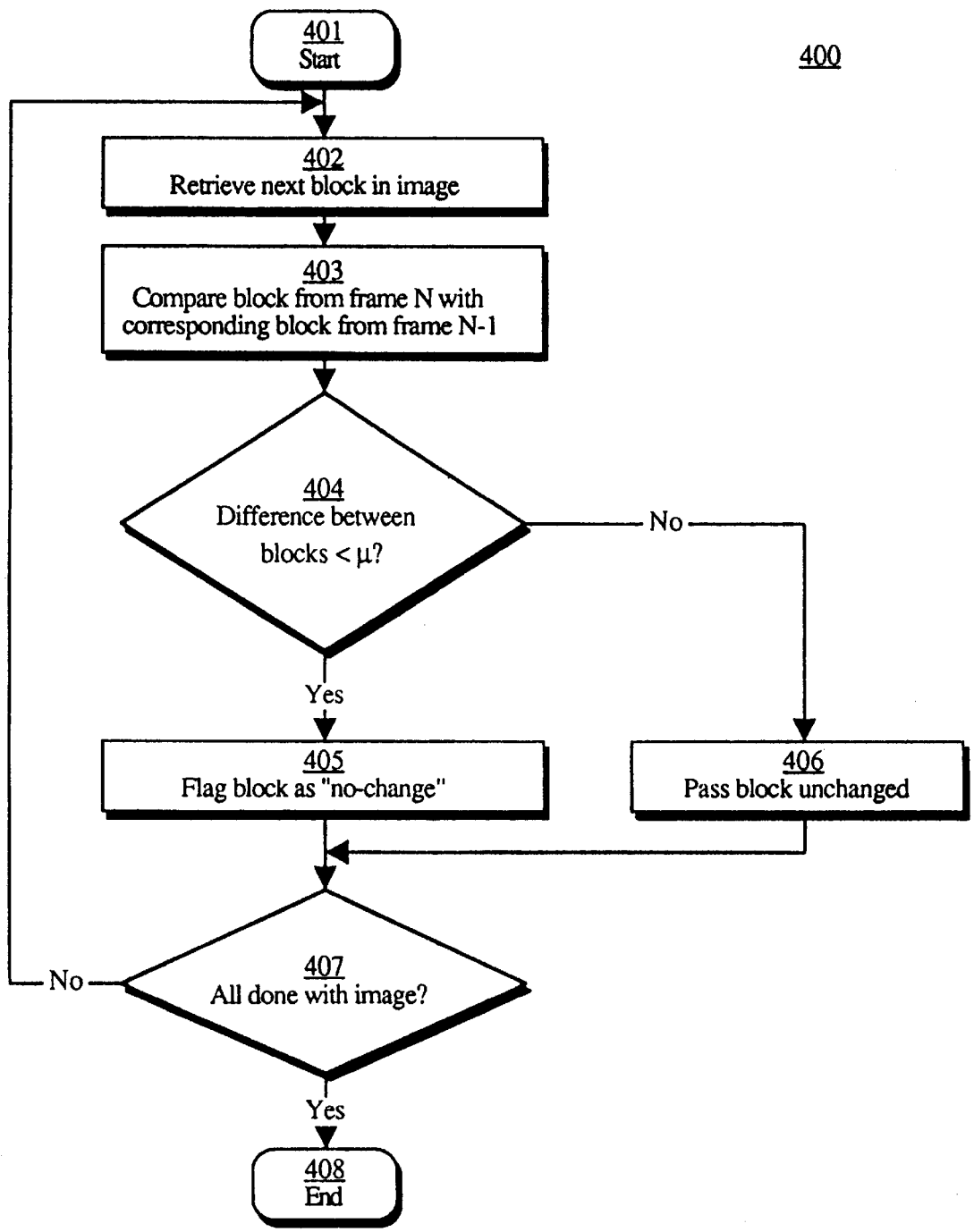
FIG. 4 shows a preprocessing technique which identifies no-change blocks.

In a preferred embodiment, a series of decisions are made in order to determine whether to encode an image vector or to send a "no-change" block tag. In the case of a "no-change" block, compression is almost always improved because an index does not have to be sent for that image block. Encoding speed is improved because there are less image vectors to create a codebook from and find an index for. Decoding time is also improved because the new block does not have to be placed on the screen over the decoded block from the previous frame. Thus, instead of transmitting an index referring to an element in a codebook, a no-change tag is sent by preprocessor 320 and passed by vector quantizer 330 specifying that the block has not changed substantially from a previous frame's block at the same position. This is shown and discussed with reference to FIG. 4. Process 400 starts at step 401 and retrieves the next block in frame N at step 402. This image block of frame N is then compared by preprocessor 320 to the image block of the same location from the decoded frame N-1 at step 403 (the decoded frame N-1 is extracted from the output of the encoder bitstream and decoded). If the error between the blocks is greater than some adaptive threshold $\mu$, as detected at step 404, then the block is passed unchanged to be coded by vector quantizer 330 at step 406. Otherwise, the block is tagged as a "no-change" block for VQ 330 and no vector quantization is performed as shown at step 405. Note that in an alternative embodiment, the no-change block can have a pixel offset associated with it which indicates which of the previous frame's blocks, within a search region, is a good enough match.

In cases where the desired datarate and quality is very high, the image block that passes $\mu$ as a no-change block is put through a more rigorous test before being tagged as a no-change block. The number of frames over which the block has been a no-change block, referred to as the "age" of the block, is checked to make sure it has not exceeded a maximum allowable age. If it has not exceeded the maximum allowable age, the block remains a "no-change" block. If it has exceeded the maximum allowable age, the error between that block and the block in the same location of the previous decoded frame is compared to a tighter threshold, for example, $\mu/2$. This is done in order to prevent no-change blocks from remaining in a given location for a long period of time, which can be noticeable to the viewer. A side effect of using block aging occurs when a large number of blocks age and reach the maximum age together. This results in a sudden datarate increase, which can trigger subsequent large fluctuations in datarate unrelated to image content. To prevent this from occurring, each block is initialized in the preferred embodiment with varying starting ages, which are reset periodically. This can be done randomly, but if it is done in contiguous sections of the image, aging will break up the bitstream with block headers less often. The main disadvantage of aging "no-change" blocks is a higher datarate, so it is most appropriate for use when the desired datarate does not demand very high compression, but does demand very high quality. Process 400 ends at steps 408, when a frame is completely processed, as determined at step 407.

The decision to tag a block as "no-change" can still be overturned (e.g. the block data will be transmitted) once spatial subsampling has been performed (see discussion below). If the net gain in compression from having a "no-change" block is lost by the blockheader overhead required to tell the decoder that subsequent block(s) are "no-change," then the "no-change" block is changed back to the blocktype preceding or following it. An example of when this occurs in the current embodiment is when there is a single 4×4NC (4-2×2 no-change) block in the middle of stream of subsampled blocks. The single 4×4NC block requires one header preceding it and one header following it to separate it from the stream of subsampled blocks, yielding 16 bits assuming one byte per blockheader. If the single 4×4NC block were changed to a subsampled block, it would only require one 8-bit index (for a 256 entry codebook), which is less costly than keeping it as a 4×4NC in terms of the number of bits transmitted.

There are a variety of error and threshold calculations that are useful for determining no-change block selection in process 400. The error criterion used for block comparison in the preferred embodiment is a squared error calculation. SNR (signal power-to-noise power ratio) can also be used in an alternative embodiment, which is useful because it allow larger errors for areas of higher luminance. This correlates with the fact that the human eye is less sensitive to changes in intensity in regions of greater intensity (Weber's Law). The threshold $\mu$ is initially determined in the preferred embodiment from the user's quality settings, but is allowed to vary from its initial value by adapting to rate control demands and to a previous series of frames' mean squared error (frame_mse). The approach used in the preferred embodiment is to calculate the no-change threshold and $\mu$ as follows:

$ncthreshfactor_n = ncthreshfactor_{(n-1)} +$ $\beta * \text{long\_term\_error}_{(n-1)} (\beta = 0.001)$ $\mu_n = ncthreshfactor_n * \text{frame\_mse}_n$ min $mse$ bound $< \mu <$ max $mse$ bound long_term_error, which will be discussed in more detail below in the discussion of the improved rate control mechanism 345 provides a benchmark for achieving the required datarate over a period of time. No-change blocks will be flagged more frequently if the long_term_error indicates that the datarate is too high. Conversely, no-change blocks will be flagged less frequently if the long_term_error indicates that the datarate produced is even lower than desired. Instead of reacting instantaneously, $\mu$ is buffered by $\beta$, which effectively controls the time constant (or "delay") of the reaction time to changing the datarate. This prevents oscillatory datarates and also allows a tolerance for more complex images with a lot of variation to generate more bits, and less complex images with less variation to generate less bits, instead of being driven entirely by a datarate. Because of the range of quality achievable in a given sequence, the no-change threshold $\mu$ maintains the quality of the most recently encoded part of the sequence by taking into account frame_mse. Frame_mse is also used by rate control 345 and will be discussed in more detail in the rate control section.

SPATIAL SUBSAMPLING

Another technique performed by preprocessor 320 in the preferred embodiment is that of spatial subsampling. Spatial subsampling is used to reduce the amount of information that is coded by vector quantizer 330. This results in faster encoding and more compression at the cost of some spatial quality. The primary challenge is to maintain high quality and compression. There are two approaches which can be taken by the preferred embodiment, each with different benefits. In the first approach, the image is separated into "smooth" and "detailed" regions by sonic measure, where blocks that are "smooth" are subsampled according to datarate demands. For example, "smooth" regions may be determined by comparing the mean squared error between the original block and the corresponding subsampled and unsampled block. This is advantageous because "smooth" regions that are subsampled usually produce the least noticeable artifacts or error. An additional benefit to this approach occurs when two separate codebooks are generated for subsampled and 2x2C ("change") blocks, and each codehook is shared across several frames. With subsampling based entirely on "smoothness", the two codebooks are able to represent the "smooth" and "detailed" areas well across many frames, because the image vectors in the "smooth" areas are usually very similar across many frames, and the same is true for "detailed" regions. In the second approach, where zones are used, the location of the block in the image also affects the subsampling decision. The advantages of the second approach include the ability to efficiently (in terms of bits) communicate to the decoder which areas of the image to postfilter, and more efficient run length blockheader coding by congregating subsample blocks together.

Figure 5A:
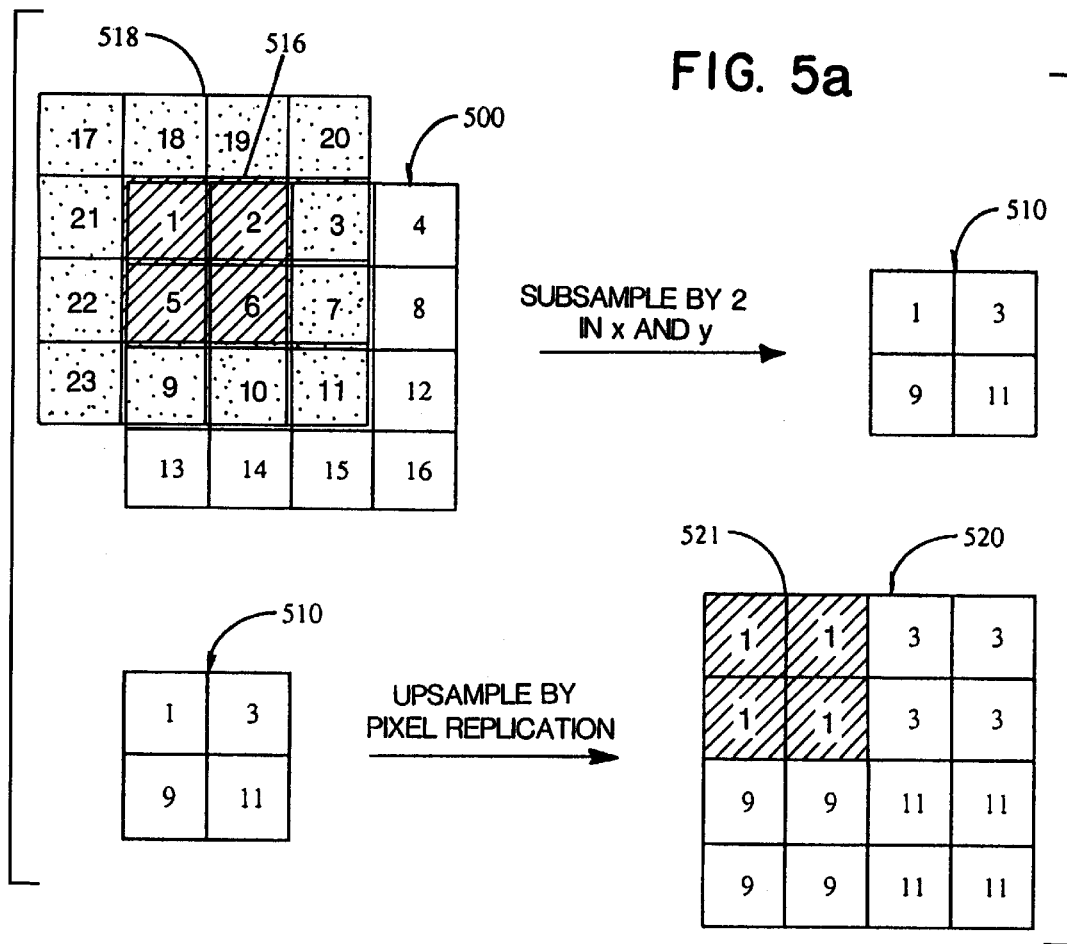
FIGS. 5*a* and 5*b* show examples of subsampling used in the preferred embodiment.

The subsampling process is discussed with reference to FIG. 5a. For subsampling, the image is divided into 4x4 blocks such as shown in FIG. 5a. Each 4x4 block is reduced to a 2x2 block such as 510 if it is selected to be subsampled. A filtering subsampling operation performed in the preferred embodiment actually uses a weighted average of each of the four 4x4 pixel blocks (e.g. block 518, comprising pixels 1–3, 5–7, 9–11, and 17–23) for representing the subsampled block 516 (block of pixels 1, 2, 5, and 6 in the case of block 518). As shown, in an alternative embodiment, single pixels (e.g. 1, 3, 9, and 11) can be sampled and used for the subsampled block 510, in a simpler subsampling scheme. If the entire image were subsampled using either of these techniques, the number of vectors going into improved vector quantizer 330 would be reduced by a factor of 4, and therefore, the number of codebook indices in the final bitstream would also be reduced by a factor of 4. In alternative embodiments, subsampling can also be done only in the horizontal direction, or only in vertical direction, or by more than just a factor of 2 in each direction by sampling blocks larger than 4x4 pixels into 2x2 pixel blocks. During decoding, improved decoder 351 detects, in a header preceding the indices, that the indices contained in a block such as 510 refer to subsampled blocks, and replicates each pixel by one in both the horizontal and the vertical directions in order to recreate a full 4x4 block such as 520 (e.g. see, block 521 comprising 4 pixels, which each are equal to pixel 1 in the simple subsampling case). Note that block 521 can also be represented by four $\gamma$'s instead of four 1's, where $\gamma$ is a weighted average of block 518. In another alternative embodiment, the pixels between existing pixels can be interpolated from neighboring pixels in order to obtain better results. This, however, can have a detrimental effect on the speed of the decoder.

Figure 5B:
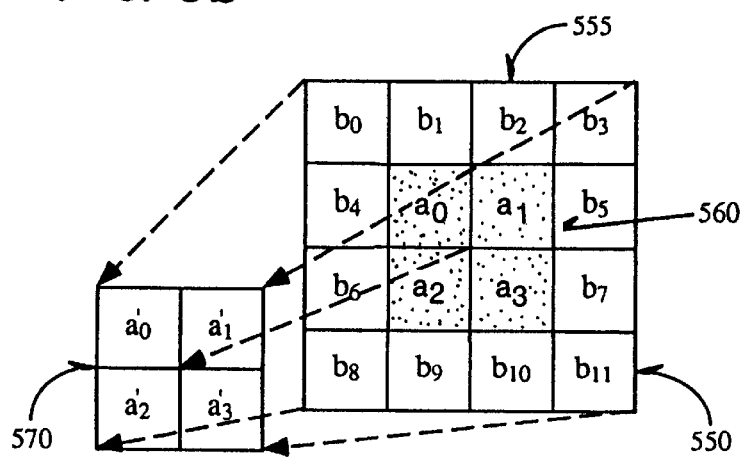

The method by which "smoothness" is determined is based on how much squared error would result if a block were to be subsampled. The subsampling operation may include filtering as well, as illustrated in the following error calculation. The squared error $\epsilon$ is calculated between each pixel of a 2x2 block such as 560 shown in FIG. 5b (comprising pixels $a_0$–$a_3$) and the average $\gamma$ of its surrounding 4x4 block 555 (comprising pixels $a_0$–$a_3$ and $b_0$–$b_{11}$):

$$\gamma = \frac{1}{16} \left( \sum_{i=0}^{11} b_i + \sum_{i=0}^{3} a_i \right)$$

$\gamma$ calculated from block 518 is used in place of the value of pixel 1 in 2x2 block 521. If a 2x2 block such as 560 were to be subsampled, then the average of its surrounding 4x4 $\gamma$ (block 555), would be transmitted instead of the four individual pixel values $a_0$–$a_3$. The average $\gamma$ is useful in reducing blockiness. Thus, as shown with reference to FIG. 5, the value $\gamma$ is transmitted instead of the four original pixel values $a_0$–$a_3$ of block 530. The squared error $\epsilon$ is then scaled by a weighting coefficient k to approximate the human visual system's luminance sensitivity (or the SNR can be used as a rough approximation instead of MSE). Thus regions of high luminance are more easily subsampled assuming the subsampling errors are the same. The four scaled errors are then added to generate the error associated with each 2x2 block such as 560:

$$\epsilon = \sum_{i=0}^{3} k[Y_i] * (a_i - \gamma)^2$$

$Y_i$: quantized luminance value of pixel $a_i$

In order to rank a 4×4 block 500 as a candidate for subsampling, each of the subsampling errors $\epsilon$ from the four 2×2 blocks of pixels aligned at the corners within the 4×4 500 are added. Blocks are chosen for subsampling from smallest error to largest error blocks until the rate control determines that enough blocks have been subsampled to meet the desired frame size. In an alternative embodiment, edges in the image may be extracted by edge detection methods known to those skilled in the art in order to prevent edges from being subsampled. Basing the decision to subsample on subsampling error has a tendency to preserve most edges, because subsampling and then upsampling across edges tend to produce the largest errors. But, it is also useful in some circumstances to explicitly protect edges that are found by edge detection.

Subsampling purely on the basis of error works in most cases, but there are images where subsampled blocks do not necessarily occur adjacent to each other. Consequently, the appearance of subsampled blocks next to non-subsampled blocks can cause a scintillating effect that can be visually distracting to a viewer. It appears as if blocks are moving because some blocks are subsampled and others aren't. Secondly, if subsampled blocks and standard encoded blocks are mixed together spatially, considerable bandwidth (in bits) is consumed by having to delineate block type changes by block headers which are identified by preprocessor 320 (block headers are discussed in more detail below with reference to the bitstream syntax). In such images, zones can be used in the encoding scheme of an alternative embodiment to reduce the two aforementioned shortcomings of subsampling based on error alone. The image is divided by preprocessor 320 into 32 rectangular zones (eight horizontal and four vertical), each of which has a weighting associated with them. Obviously, the number of zones and their sizes can be fairly diverse. In one embodiment, weighting the border zones of the image may be performed so that it is more difficult to subsample the center zones. This assumes that the viewer will pay less attention to the edges of the image because the camera will be roughly centered on the object of interest. Another embodiment uses fast motion to conceal some of the subsampling artifacts. If the motion is not 'fast', as determined by motion estimation algorithms known to those skilled in the art, it may be useful to make it more difficult to subsample areas of motion. This assumes that the viewer will track objects of motion, and will notice subsampling artifacts unless the motion is fast.

In the second approach of the preferred embodiment, zones are sorted according to their zonal errors, which is the average squared error $\hat{\epsilon}$:

$$\epsilon_j = \sum_{\text{zone } j} \epsilon$$

$$\hat{\epsilon}_j = \frac{\epsilon_j}{\text{\# of subsampled pixels in zone } j}$$

and each zone is weighted according to its location to produce zone error ZE:

$$ZE_j = \hat{\epsilon}_j * \text{zone\_weight}[j], \text{ zone } j$$

Blocks tagged for subsampling are subsampled in order of best to worst zones, in terms of zone error, until the number of subsampled blocks requested by rate control 345 is reached. Improved decoder 351 is able to determine from the input bitstream 350 which zones have been subsampled and, depending on certain criteria (such as quality settings, etc.), may decide whether or not to postfilter (process 375) those zones during decoding in order to soften blockiness. Because subsampling is zonal, decoder 351 knows where to concentrate its efforts instead of trying to postfilter the entire image. The overhead required to communicate this information to the decoder is minimal, only 32-bits for the 32 rectangular zone case.

In order to prevent the entire zone from being subsampled, only blocks which have errors less than the edge_mse are subsampled within the zone. The edge_mse value is controlled by the rate control, so more blocks are preserved from subsampling if the compressed frame size desired is large.

$$\text{edge\_mse}_n = \text{edge\_mse}_{(n-1)} + x^*\text{long\_term\_error}$$

In an alternative embodiment, the edge_mse can be weighted so that edges in the image, extracted by edge detection methods known to those skilled in the art, are preserved from subsampling.

Directional Filtering

Spatial redundancy may also be reduced with minimal smearing of edges and detail by performing "directional" filtering in an alternative embodiment. This processing performs a horizontal, vertical, upward diagonal and downward diagonal filter over an area surrounding a pixel and chooses the filter producing the minimum error. If the filter length is 3 taps (filter coefficients), computing the filtered value of pixel 6 in FIG. 5a would mean applying the filter to pixels 5, 6, and 7 for a "horizontal" filter, applying the filter to pixels 2, 6, and 10 for a "vertical" filter, applying the filter to pixels 1, 6, and 11 for a "downward diagonal" filter, and applying the filter to pixels 9, 6, and 3 for an "upward diagonal" filter in order to generate a filtered value for pixel 6. For example, in order to perform the "horizontal filter," the value may be represented as $f_h$ wherein $f_h$ is computed in the following manner:

$$f_h = a_1.\text{pixel5} + a_2.\text{pixel6} + a_3.\text{pixel7}$$

wherein $a_1$, $a_2$, and $a_3$ are weighting coefficients. $a_1$, $a_2$, and $a_3$ may be equal to 0.25, 0.5, and 0.25, respectively, so that more weight is given to center pixel 6 of the 3×3 block and the result $f_h$ may be computed using computationally inexpensive shift operations. Note that these filters can be applied in three dimensional space as well, where the additional dimension is time in yet another alternative embodiment.

Comparing the results of these directional filters also gives information about the orientation of the edges in the image. The orientation of the edge may be extracted by comparing the ratio of the errors associated with orthogonal direction pairs. The first step is to select the direction which produced the minimum error, min_directional_error, and compare this error with the errors associated with the filter in the other three directions. Characteristics which would indicate that there is a directional edge in the direction of the minimum error filter include:

the direction orthogonal to that of the minimum error filter produced the maximum error the maximum error filter has an error significantly larger than the other three directions, particularly when compared to the direction orthogonal to itself.

If the filtered area has directional errors which are very close to one another, then the area is "non-directional." Areas of "non-directional" blocks can be filtered more heavily by applying the filter again to those areas. The minimum error filter is very adaptive since it may vary its characteristics for every pixel according to the characteristics of the area around the pixel.

YUV TRANSFORMATION

The preferred embodiment also uses luminance and chrominance values (YUV) of the vectors for codebook generation and vector quantizer 330 to improve speed and/or quality. The YUV values can be calculated from the red, green, and blue (RGB) values of the pixels in the vectors via a simpler transformation whose reconstruction is computationally inexpensive, such as the following transformation which is realizable by bit shifts instead of multiplication:

$$Y = \frac{R}{4} + \frac{B}{4} + \frac{G}{2}$$

$$U = \frac{R - Y}{2}$$

$$V = \frac{B - Y}{2}$$

Performing codebook generation using YUV in vector quantizer 330 can improve clustering because of the tighter dynamic range and the relative decorrelation among components. Consequently, improvement in quality is noticeable. For situations where encoding speed is important, the chrominance (U,V) values can be subsampled by 2 or 4 and weighted (by shifting, for example) in the vector quantization step 330.

In the preferred embodiment, luminance and chrominance is passed to vector quantizer 330 by preprocessor 320 after the preprocessing of RGB values such as subsampling or filtering of vectors of the input image. In an alternative embodiment, YUV transformation may be done first and preprocessing such as subsampling can be done after the YUV transformation. At any rate, the resulting preprocessed data passed to improved VQ 330 is in YUV format.

IMPROVED VECTOR QUANTIZER

Vector Quantization (VQ) is an efficient way for representing blocks or vectors of data. A sequence of data, pixels, audio samples or sensor data is often quantized by treating each datum independently. This is referred to as scalar quantization. VQ, on the other hand, quantizes blocks or vectors of data. A primary issue with VQ is the need to find a set of representative vectors, termed a codebook, which is an acceptable approximation of the data set. Acceptability is usually measured using the mean squared error between the original and reconstructed data set. A common technique for codebook generation is described in Linde, Y., Buzo, A., and Gray, R., "An Algorithm for Vector Quantizer Design," COM-28 *IEEE Transactions on Communications* 1 (January 1980) (known as the "LBG" algorithm). A technique which employs the LBG algorithm to generate a codebook starts by sampling input vectors from an image in order to generate an initial estimate of the codebook. Then, each of the input vectors is compared with the codebook entries and associated with the closest matching codebook entry. Codebook entries are iteratively updated by calculating the mean vector associated with each codebook entry and replacing the existing entry with the mean vector. Then, a determination is made whether the codebook then has improved significantly from a last iteration, and if not, the process repeats by comparing input vectors with codebook entries and re-associating, etc. This codebook generation may be done on a large sequence of images, the training set, or the codebook may be regenerated on each frame. In addition, this technique may be applied to binary trees used in certain prior art vector quantization systems for encoding efficiency.

Figure 6:
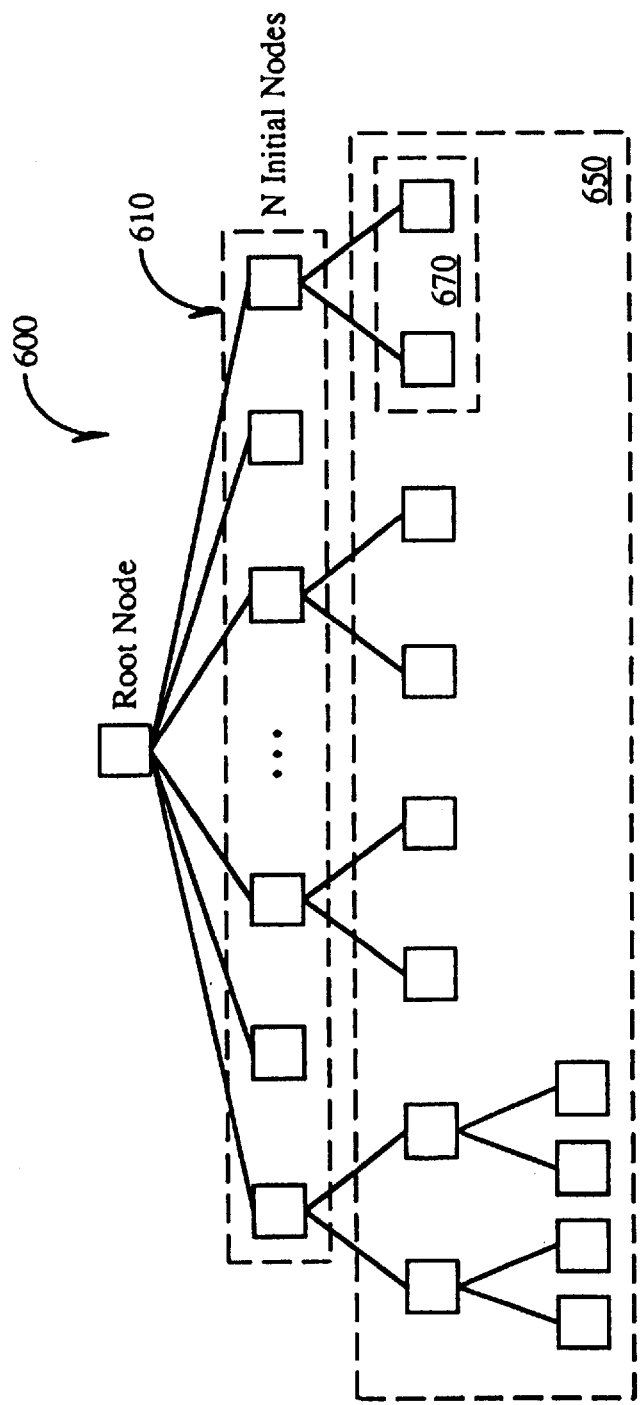
FIG. 6 shows a vector quantizer tree which may be created using the improved vector quantization provided by the preferred embodiment.

The improved vector quantizer 330 is organized in a tree structure. Instead of a binary tree as used in certain prior art schemes, at the root of the tree, N child nodes 610, as shown in FIG. 6, are generated initially. This may be performed using a variety of techniques. For example, in one embodiment, a segmenter may be used to extract representative centroids from the image to generate the N initial nodes which contain the centroid values. In another embodiment, the initial centroids may be determined from an image by extracting N vectors from the image itself. Prior art binary trees have relied simply upon the establishment of two initial nodes. Binary trees suffer from the disadvantage that the errors in the two initial nodes propagate down to the rest of the nodes in the tree. In the preferred embodiment, N nodes are used wherein the value N varies depending on image characteristics. This advantage is related to the fact that more initial nodes reduce the chances of incorrect binning at the root level. Better quality and faster convergence can be achieved from using N initial nodes in creating the tree, where N adapts to the image and is usually greater than two.

The improved vector quantization process 700 performed on the image is shown and discussed with reference to FIGS. 6, 7, and 8. The creation of the N initial nodes is performed at step 702 shown in FIG. 7. The top layer of the tree 610 is improved from the N initial nodes by iteratively adjusting the values of the initial nodes and associating vectors with them at step 703. This iterative process is described below with reference to FIG. 8, which shows an iterative node binning/recalculation process. Then, at step 704, the node with the worst distortion is determined, where its distortion is calculated from a comparison between the node's centroid value and its associated vectors. In the preferred embodiment, mean squared error between the vectors associated with the node and the node's centroid value is used as a distortion measure. Note that the determination of which node is the most distorted may be made using many measures in alternative embodiments, including population, total distortion associated with the node, average distortion associated with the node and/or peak distortion associated with the node. At any rate, once the most distorted node is determined at step 704, then this node is split into two children nodes at step 705. Of course, even though two children nodes are described and used in the preferred embodiment, more than two children nodes may be created in an alternative embodiment. Then, an iterative process upon the children nodes is performed at step 706 in order to obtain the best representative vectors. This process is described in more detail with reference to FIG. 8.

Figure 7:
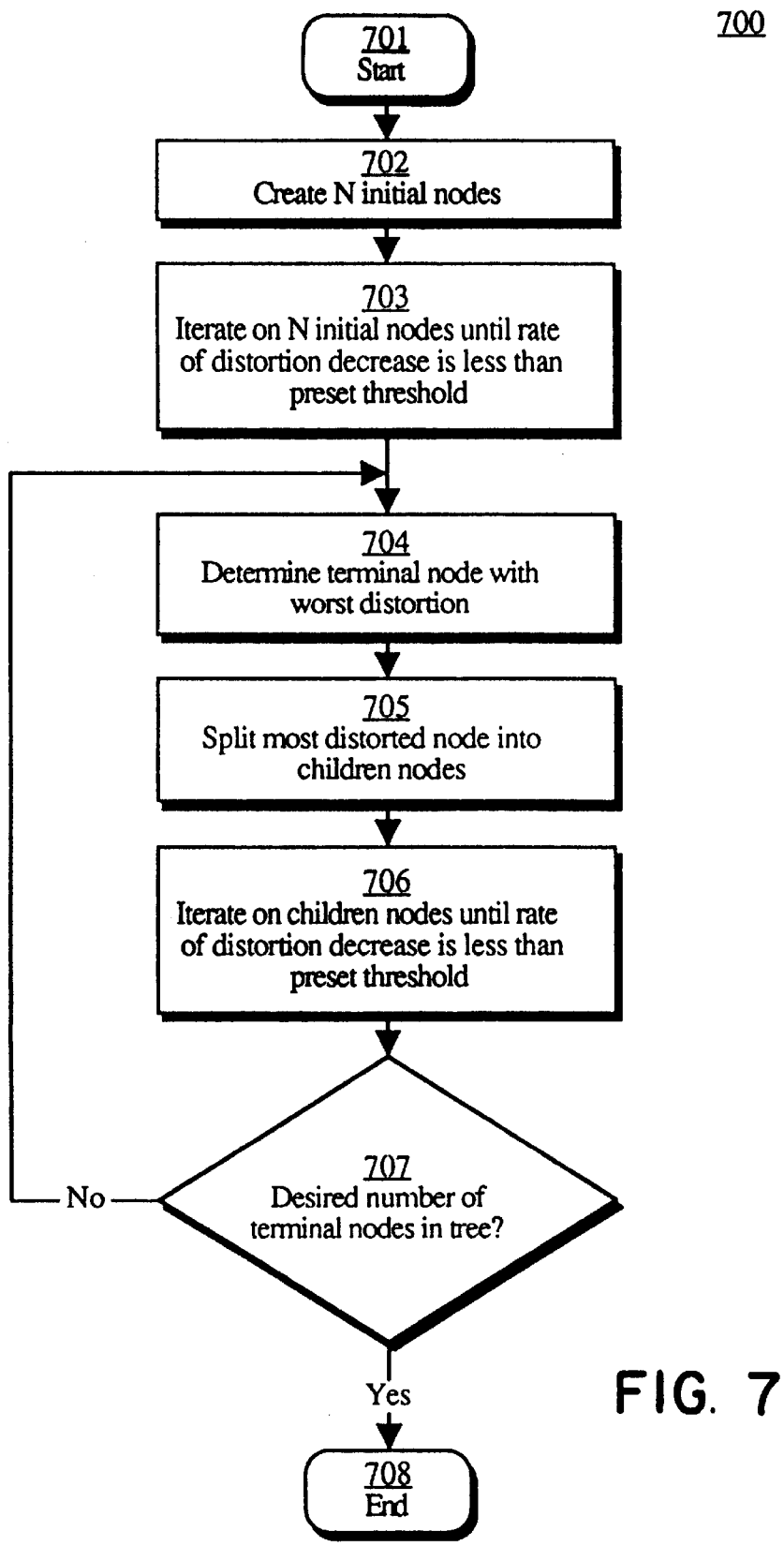
FIGS. 7 and 8 show an improved vector quantizer process which may be used to create the tree shown in FIG. 6.
Figure 8:
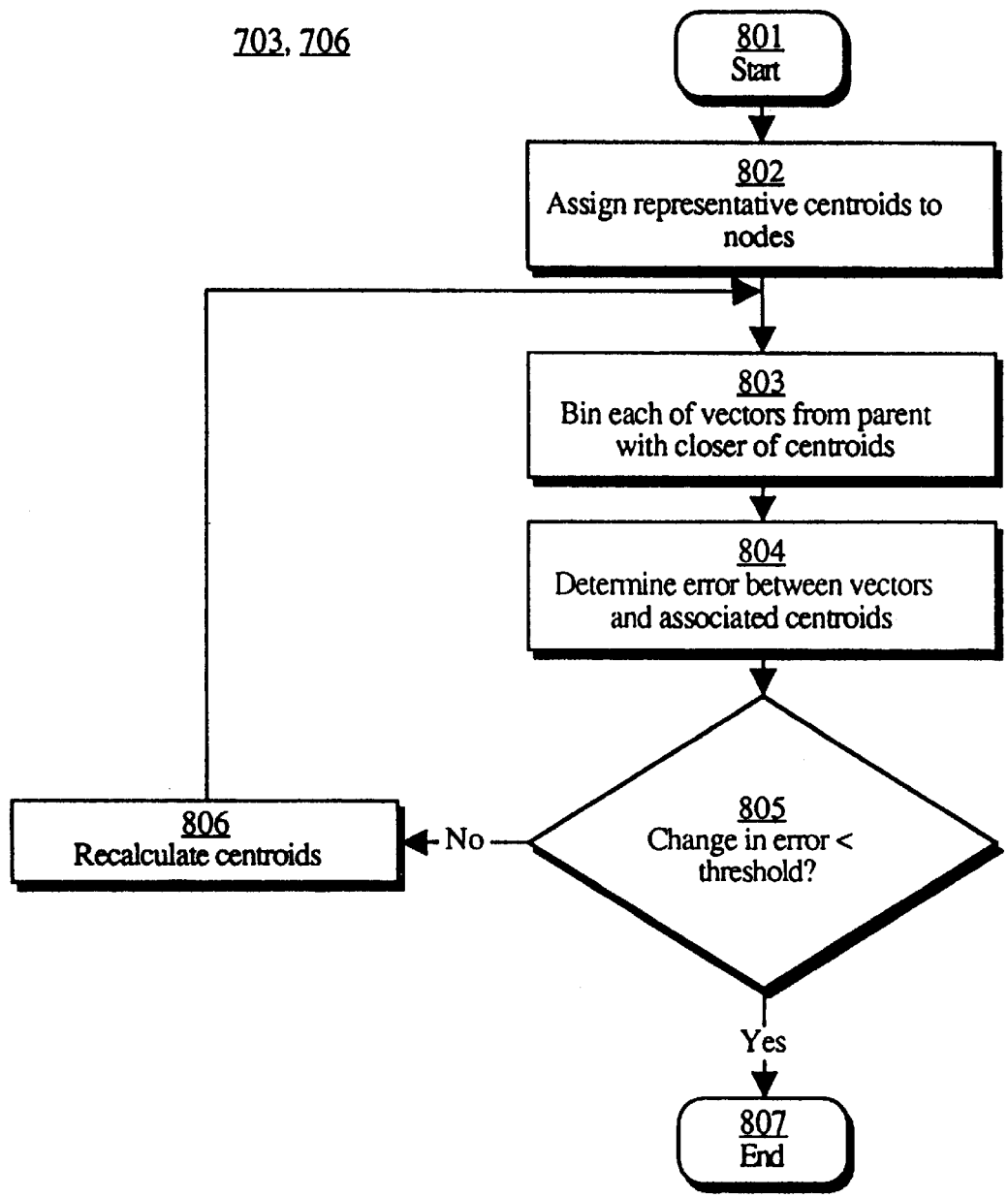

The iterative process such as used at steps 703 or 706 applied to the created children nodes from the most distorted node is shown in FIG. 8. This process starts at step 801. At step 802, it then assigns representative centroids to the child nodes, such as 670 shown in FIG. 6, from the group of vectors associated with its parent node. In the case of a root node, all of the vectors of the image are used to create representative centroids. Then, each of the vectors is associated (or "binned") with the node having the closest centroid. Then, at step 804, the error between the vectors associated with each of the centroids and the centroid itself is determined. The error calculation may be performed using a variety of techniques, however, in the preferred embodiment, a mean squared calculation is used. Once the error calculation has been determined at step 805, it is determined whether the change in the error has become less than a certain threshold value. In step 806, new centroids are calculated from the vectors associated with the nodes from step 803, and this done for all of the nodes from step 803. On a first iteration of the process shown in 706, the change in error will be very large, going from a large preset positive value to the error values calculated. However, on subsequent iterations of the loop comprising steps 803 through 806, the change in error will become smaller, eventually becoming less than the threshold values. If the change in total error associated with the node currently being split is not less than the threshold value as determined at step 805, then the new centroids are recalculated at step 806, and process 703 (706) continues to repeat steps 803 through 806 again, as necessary. This is done until the change in error is less than the predetermined threshold value as detected at step 805. Once the change in error becomes less than the threshold value as detected at step 805, then process 703 (706) ends at step 807 and returns to process 700 of FIG. 7.

Once this iterative process is complete, at step 707 in FIG. 7, it is determined whether the desired number of terminal nodes in the tree have been created. Each time a node is split, two or more additional child nodes are produced in VQ tree 600. Thus, in the preferred embodiment, the total number of terminal nodes desired determines how many times nodes in VQ tree 600 will be split. Process 700 continues at step 704 through 707 until the desired number of terminal nodes in the tree have been created. Once the desired number of terminal nodes in the tree have been created, then process 700 is complete at step 708, and the codebook may be transmitted on the output bitstream to packer/coder 340 shown in FIG. 3.

The type construct used in the preferred embodiment for a node is defined in the "C" programming language as follows:

The vector quantization process 700 of the preferred embodiment for the creation of a VQ tree such as 600 is performed using a number of novel techniques.

First, an adaptive convergence threshold (i.e. that used in 805) is used to control the number of iterations used to generate the codebook tree. This works in one of the following two ways:

1. If the complete tree is to be updated, then a looser convergence criterion is applied to the initial N nodes. The complete tree may need to be updated in a case where a scene change has occurred or the image has changed significantly from the previous image.
2. If the root node from a previous tree is used in constructing the current tree then no iterations are performed on the root node. Root nodes may be reused where a like sequence of images is encoded and no scene change has yet been detected. Thus, N initial nodes such as 610 can be reused from a previous frame's VQ.

Second, a modified distance measure is used in the preferred embodiment to improve reconstructed image quality. Usually mean squared error (mse) between image vector and codebook entry is used to determine the closest matching codebook entry to a given vector, for example, at step 803 in FIG. 8. In the early stages of tree generation the preferred embodiment modifies this calculation to weight large errors more heavily than is the case with squared error. In this manner, large errors are weighed more heavily than smaller errors.

Third, multiple criteria are used to determine which nodes should be split. Measures which may be employed include, but are not limited to:

1. Total distortion associated with a specific node.
2. Average distortion associated with a specific node.
3. Population associated with a specific node.
4. Percentage distortion associated with a specific node.
5. Maximum distortion associated with a specific node.
6. Ratio of maximum to minimum distortion associated with a specific node.

```
typedef struct tnode {
unsigned long *centroid;              // pointer to centroid for this node
unsigned long *vcct_index_list;//pointer of list of vector indices associated with
                              this node
unsigned long num_vcct;               // number of vectors associated with this node
unsigned long distortion,*             // total distortion associated witn this node
unsigned long avg_dist;               // Average distortion associated with this node
unsigned long peak_dist;              // Peak distortion associated with this node
unsigned long percent_dist;           // percentage distortion associated with this node
unsigned long num_children;           // number of children
unsigned long ic_method;              // method for initializing this node
struct tnode **children;              // pointer to a list of structures for the child
                                      nodes of this node
struct tnode *parent;                    // pointer to the parent of this node
unsigned char terminal;               // flag to indicate if this is a terminal node
unsigned long *childrencptrs;         // pointer to an array of pointers to
                                         // centroids of children (used to
                                         // simplify and speed up distortion
                                         // calculation)
                                         }
```

Thus, the nodes comprising a tree VQ such as 600 each have a datum such as that defined above which may maintain certain information associated with them such as various distortion measures, number of binned vectors, number of children, etc. This information is useful for the tree creation process discussed above.

Total distortion associated with a node is used in the preferred embodiment; however, better quality results may be achieved if population is used as a measure in the final stages of tree generation in an alternative embodiment. If mean squared error is used as the distortion measure, then the total distortion is the sum of the mean squared errors. The use of the other distortion measures, or combinations thereof, may be used in yet other alternative embodiments, each having certain advantages according to image content, or desired quality.

Fourth, multiple retries are attempted in order to split nodes. Occasionally, an attempt to split a specific node fails. In this case, a number of other initial conditions are generated which will assist in leading to a successful split. For example, one way in which this may be performed is by adding noise to an initial split. For certain images characterized by flat or very smooth varying color or luminance areas, node splitting is difficult. A small amount of random noise is added to the image vectors prior to splitting. The noise is pseudorandom and has a range between zero and two least significant bits of the input image data. One manner in which the noise is generated is to use a pseudorandom noise generator. This value is added to each of the RGB components of each pixel of each vector to be encoded. The random noise added to each of the RGB components of each pixel will differentiate them enough in order to achieve a successful split. More generally, assuming that a decision has been made on which node to split, the algorithm does the following:

1. Generate K candidate initial nodes by subsampling the vector list associated with the node.
2. Cluster the vector list using these initial nodes.
3. If the clustering fails (i.e. all the vectors cluster to one node), identify this node as having failed to cluster with this method.
4. When the next attempt is made to split this node, use a different initial estimate for the node centroids. Techniques for generating this estimate include but are not limited to:
   a. Perturb the centroid in the parent node; or
   b. Pick the most distorted vectors in the nodes vector list as the initial centroids.
5. Further attempts are made to cluster using these initial nodes. If all the methods fail to produce a split in the vector list the node is tagged as a terminal node and no further attempts are made to split it.

Fifth, reuse first layer of the codebook tree between multiple frames. In many image sequences, the major image features change slowly over time (for example, background images tend to change or move slowly). The top layer of the codebook tree 610 comprising N initial nodes captures these features. Enhanced performance in terms of computational speed and improved image quality can be obtained by reusing the top layer of the tree from one frame to the next. This reuse may be overridden from a higher level in the codec. For example in the cast of a scene change, which is detected by the encoder, higher quality may be achieved if the root node is regenerated rather than being reused.

Sixth, in order to best use the available entries in a codebook, it is common to remove the mean value of the vectors prior to coding. While this leads to better reconstructed image quality, it causes additional complexity at the decoder. The preferred embodiment utilizes a technique which gives many of the advantages of mean residual VQ without the decoder complexity. The technique works as follows. The mean value is calculated for a large image or "zone," and then this mean is subtracted from all the vectors in the large zone. The residual vectors are encoded in the usual fashion. At the decoder, codebooks for each of the large zones are reconstructed. This is done by adding the mean values of the large zones to the residual codebook. The result is the generation of as many codebooks as there were large zones at the encoder.

VARIABLE SIZE, SHARED, AND MULTIPLE CODEBOOKS FOR IMAGES

In the preferred embodiment, each image is associated with a codebook which has been adapted to the characteristics of that image, rather than a universal codebook which has been trained, though a combination of fixed codebook and adaptive codebook is also possible in alternative embodiments. In alternative embodiments, each image need not be limited to having exactly one codebook or a codebook of some fixed size. Alternative embodiments include using codebooks of variable size, sharing codebooks among frames or sequences of frames, and multiple codebooks for the encoding of an image. In all of these alternative embodiments, the advantage is increased compression with minimal loss in quality. Quality may be improved as well.

Variable Size Codebooks

For a variable size codebook, the nodes in the tree are split until some criterion is met, which may occur before there are a specified number of terminal nodes. In one embodiment, the number of codebook vectors increases with the number of blocks that change from the previous frame. In other words, the greater the number of no-change blocks, the smaller the codebook. In this embodiment, codebook size is obviously related to the picture size. A more robust criterion, which is used in the preferred embodiment, depends on maintaining a frame mean squared error (not including no-change blocks). If 128 2×2 codebook vectors are used instead of 256, the net savings is 768 bytes in the frame. This savings is achieved because each 2×2 block comprises a byte per pixel for luminance information and 1 byte each per 2×2 block for U and V chrominance information (in the YUV 4:1:1 case). Reducing the number of codebook vectors from 256 to 128 yields 128·6=768 bytes total savings. For images where 128 codebook vectors give adequate quality in terms of MSE, the 768 bytes saved may be better used to reduce the number of subsampled blocks, and therefore improve perceived quality to a viewer.

Shared Codebooks

Another feature provided by the preferred embodiment is the use of shared codebooks. Having one or more frames share a codebook can take advantage of frames with similar content in order to reduce codebook overhead. Using a shared codebook can take advantage of some temporal correlation which cannot be efficiently encoded using no-change blocks. An example of such a case is a panned sequence. If two frames were to share a 256 element codebook, the savings would be equivalent to having each frame use separate 128 element codebooks, but quality would be improved if the frames were not completely dissimilar. Obviously, the separate 128 element codebook case could use 7 bit indices instead of 8 bit indices, but the lack of byte alignment makes packing and unpacking the bitstream unwieldy. Reduced codebook overhead is not the only advantage to using a shared codebook. For example, temporal flickering can also be reduced by increasing the correlation in time among images by using the same codebook. There is also a gain in decoding speed since an entirely new codebook doesn't have to be unpacked from the bitstream and converted back to RGB with each frame.

In order to make sure that the shared codebook constructed from previous frame(s) is still a good representation of the frame to be encoded, the shared codebook can either be replaced with a new codebook, or updated in pieces. First, the frame is encoded using the shared codebook, and the frame_mse (the mean squared error between the original and decoded frame) is calculated. The shared codebook is replaced with a new codebook if the frame_mse is greater than the frame_mse from the previous frame or the average frame$_{13}$ mse from the previous frames by some percentage. If the frame_mse passes this test, the shared codebook can still be entirely replaced if the number of blocks with an MSE over some percentage of the average MSE (i.e. the worst blocks) for the entire frame is over some number. In this case, the encoder assumes that it is too difficult to fix the worst error blocks with only an update to the codebook, and will regenerate the entire codebook. Alternatively, the encoder may chose to generate the codebook update first, and then check how many worst error blocks there are, and then generate a completely new codebook if there are more than some threshold amount of bad blocks.

The preferred embodiment updates the shared codebook by reusing the structure of the tree used to generate the shared codebook, as described above in the vector quantization section. Each image vector from the new frame is associated with one of the terminal nodes of the tree (i.e. with a codebook vector). This is achieved by starting at the root of the tree, choosing which of the children is closer in terms of squared error, and choosing which of that child's children is a best match, and so forth. An image vector traverses down the tree from the root node toward a terminal node in this fashion. Using the structure of the tree instead of an exhaustive search to match image vectors with codebook vectors improves encode time, though an exhaustive search could also be performed. Also, the tree structure is useful in generating new nodes in order to update the shared codebook.

Figure 9A:
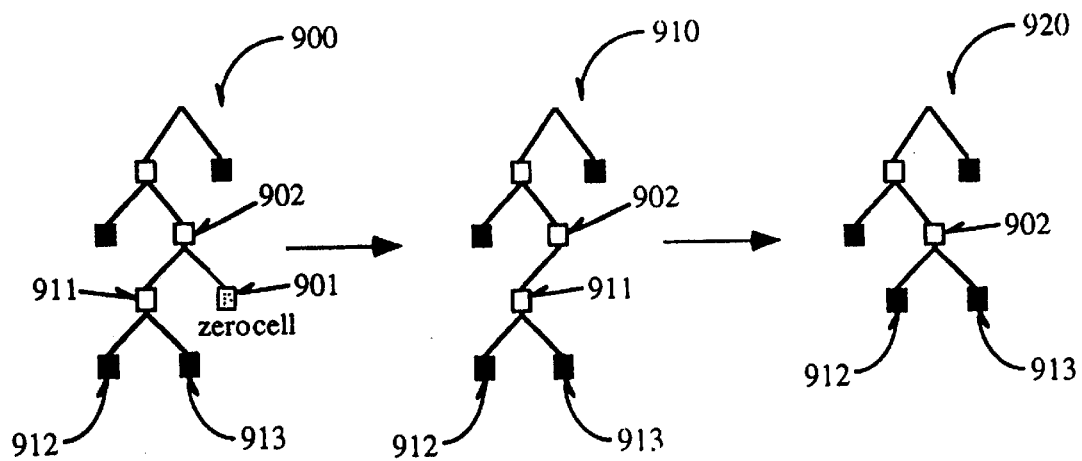
FIGS. 9*a* and 9*b* shows how nodes may be updated in a vector tree by eliminating "zero" cells and iterating on the remaining nodes.
Figure 9B:
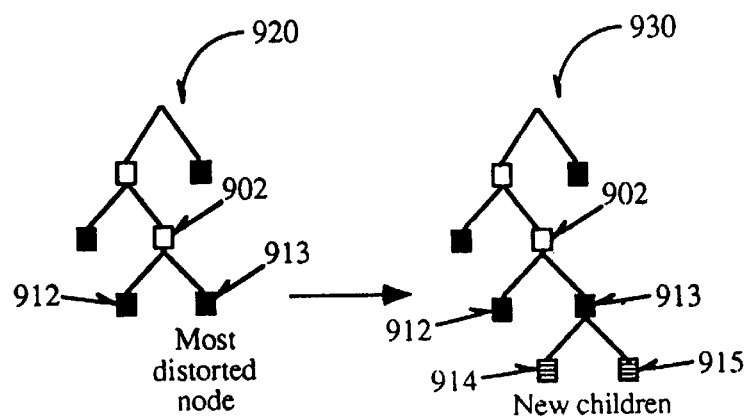

The codebook update process takes several steps. First, zero cells such as 901 (codebook vectors with no associated image vectors) are located and removed from the tree 900, a branch of which is shown in FIG. 9*a*. The terminal node number (i.e. codebook index) associated with the zero cell is noted so codebook updates may replace the codebook entry that was a zero cell. The tree pointers are changed so that 902 now points to children 912 and 913. This is shown as transformed tree 920 in FIG. 9*a*. The tree then splits nodes (FIG. 9*b*) selected by some criterion, such as those n nodes with the worst total distortion, with a method described above with regard to improved vector quantizer 330 and as shown in FIG. 9*b* by transforming tree 920 as shown in FIG. 9*b* to tree 930. Terminal nodes that were discarded because they were either zero cells, such as 901, or because parents by splitting are tagged to be overwritten with new updated codebook vectors. Finally, new children from the node splits overwrite these codebook vectors which are tagged to be overwritten. The actual overwrite occurs in the decoder, which is given the overwrite information via the bitstream (see, discussion below). If there are no zero cells, each node split would require 2 codebook vector slots, one of which could be that of the nodes' parent before it was split. The remaining child can be transmitted as an additional codebook vector instead of just a replacement for a discarded codebook vector.

With codebook sharing, the codebook that is entirely generated from a frame or set of frames is set to a size (e.g. 50%) smaller than the maximum codebook size (e.g. 256) to allow for additional codebook vectors to be added by frames using the shared codebook.

An alternative splitting and replacement method does not require that a parent, which used to be terminal node, be replaced. Instead, by constraining that one of the two children be equal to the parent, the parent does not have to be replaced. The other child replaces either a zero cell or gets sent as an additional codebook vector.

Multiple Codebooks

In yet another embodiment, multiple codebooks can be associated with an image by generating a separate codebook for each blocktype, or by generating separate codebooks for different regions of the image. The former case is very effective in increasing quality with minimal loss of compression (none if the codebook is shared), and the latter case is very effective in increasing compression ratio with minimal loss of quality.

Using separate codebooks to encode subsampled and non-subsampled image vectors provides several advantages over prior art techniques. Independent trees are tailored specifically to the traits of the two different types of blocks, which tend to be "smooth" for subsampled regions and more "detailed" for blocks which are not subsampled. The block types are separated by the error calculation described in the section on spatial subsampling. The separation between "smooth" and "detailed" regions occurs even when the compression desired requires no subsampling, because the separate codebooks work very well when the "smooth" and "detailed" blocks are separately encoded. Note that each index is associated with a codebook via its blocktype, so the number of codebook vectors can be doubled without changing the bits per index, or increasing the VQ clustering time. This results in a noticeable improvement in quality. Also, the subsampled blocks codebook and 2×2C blocks codebook can be shared with the previous frame's codebook of the same type. In such a case, it is even more important to keep "smooth" regions and "detailed" regions separate so there is consistency within each codebook across several frames. Note that this separation into detailed and smooth areas is a special case of the more general idea of defining separate trees for image categories. The categories can be determined with a classifier which identifies areas in an image with similar attributes. Each of these similar areas are then associated with its own tree. In the simple case described above, only two categories, smooth and detailed, are used. Other possible categorizations include edge areas, texture, and areas of similar statistics such as mean value or variance.

As mentioned briefly, multiple trees may be associated with different regions in the image. This is effective in reducing the encode time and increasing the compression ratio. For example, a coarse grid (8 rectangles of equal size) is encoded with eight 16-element trees. The worst error rectangular regions are then split again so that each half of each rectangular region uses a 16-element tree. This continues until there are 16 rectangles, and therefore a total of 256 codebook vectors. Each index can be encoded using only 4 bits instead of 8, giving an additional 2:1 compression. If the image is divided into 16 fixed initial regions, with no further splitting of the regions, the encode compute time is significantly reduced. This technique is particularly well suited for lower quality, higher compression ratios, faster encode modes. A compromise between using many small codebooks for small pieces of the image and one 256 entry codebook for the entire image can be most effective in maintaining quality while gaining some additional compression where the quality won't suffer as much. In such a compromise, much smaller codebooks are used only for portions of the image that are very homogeneous and only require a few codebook vectors, and the regular 256 entry codebook is used for the rest of the image. If the portion of the image associated with a much smaller codebook is constrained to be rectangular, it will require almost no overhead in bits to tell the decoder when to switch to the much smaller codebook, and hence the smaller indices (4-bits for 16 entry codebooks or 6 bits for 64 entry codebooks). If the region associated with each codebook is not constrained to be rectangular, the quality can be improved with segmentation techniques known to those skilled in the art, which group similar pixels into a region.

RATE CONTROL

Rate control 345 is an important element of the improved video compression system when the compressed material is meant to be decoded over a limited bandwidth channel. To maintain N frames/second in a synchronous architecture, or over a network or phone line, decoder 351 must be able to read one frame of data over the limited bandwidth channel, decode the information, and display the image on the screen in 1/Nth of second. Rate control 345 attempts to keep the maximum frame size below some number, which depends on the application, so that the time taken by reading the data over the limited bandwidth channel is reduced. This is accomplished in two steps: (1) determining what the desired frame size is from a datarate point of view; and (2) using this desired frame size in conjunction with quality requirements (either defined by a user or in some other manner) to control parameters in the encode process.

The rate control scheme determines what the desired frame size is, based on past performance and desired datarate. The target_frame_length is calculated as:

$$\text{target\_frame\_length} = \frac{\text{desired data} \cdot \text{rate}}{\text{desired frame rate}}$$

The desired frame length for the current frame N is equal to the target_frame_length, dampened by an error term frame_error which may be averaged over some number of frames, such as a second's worth of video data:

desired_frame_length=target_frame_length+frame_error

Note that frame_error, which is the overshoot or undershoot that will be allowed, is averaged as an IIR (infinite impulse response) filter in a recursive fashion. This may also be implemented as an FIR (finite impulse response) filter in an alternative embodiment. The value of $\alpha$ affects how quickly the current frame error (target_frame_length—avg_) frame_length) forces the long term frame error (frame_error) to respond to it. Also, the current error is defined as the difference between the target_frame_length and the average of the frame lengths of some number of frames (avg_frame_length), such as a seconds worth of data. This rate control scheme maintains an average datarate over the past second that does not exceed the desired datarate. Fluctuations in frame size occur at the per frame level, but these fluctuations are dampened by averaging effects. These relationships are determined as follows:

$(\text{frame\_error})_n = (1 - \alpha) (\text{frame\_error})_{n-1} +$ $\alpha(\text{target\_frame\_length} - (avg—\text{frame\_length})_n)$ $$(avg\_\text{frame\_length})_n = \sum_{i=n-k}^{n} a_i * \text{frame\_size}_i$$

where $$\sum_{i=n-k}^{n} a_i = 1$$

After the desired_frame_length is determined for frame N, it is used to influence the encoder parameters (ncthreshfactor and edge_mse) which control how much temporal processing and spatial subsampling to apply in those embodiments where temporal filtering and spatial subsampling are used. These encoder parameters are set by the spatial and temporal quality preferences determined by the user, but they are allowed to fluctuate about their quality setting according to how well the system is keeping up with its datarate demands. Rather than allowing these parameters to fluctuate considerably over a short period of time, they track a long term error calculated as follows:

$(\text{long\_term\_error})_n = (1-\beta)(\text{long\_term\_error})_{n-1} + \beta((\text{target\_frame\_length})-(\text{avg\_frame\_length})_n)$ Thus, the only distinction between the calculations for the long_term_error and the frame error is the difference between $\alpha$ and $\beta$. Values which have been determined to be effective are $\alpha=0.20$ and $\beta=0.02$ which are used in the preferred embodiment, although it can be appreciated by one skilled in the art that other weighting values of $\alpha$ and $\beta$ may be used.

If long_term_error is not used to control the values of encoder parameters for spatial subsampling and no-change blocks, the desired frame length can still be used to keep track of how well the datarate is being, maintained, given that no-change and subsampling thresholds are determined only by the user's quality settings. However, this doesn't guarantee that subsampling and no-change blocks can reduce the frame size to the desired_frame_size. In such a case, the value long_term_error is used to reduce the quality by changing subsampling and no-change block parameters, ncthreshfactor and edge_mse, and therefore reduce the datarate.

TRANSMISSION OF CODEBOOK INDICES

After an image has been associated with indices to a codebook via vector quantization by improved process 330, the bitstream can be packed more efficiently than prior art techniques to allow for the flexibility of future compatible changes to the bitstream and to communicate the information necessary, to decode the image without creating excessive decoding overhead. The indices may each be transmitted as an index to the codebook or as offsets from a base index in the codebook. In the former case, 8 bits are required per image vector to indicate which of the vectors of a 256 entry codebook is the best match. In the latter case, less bits may be required if there is a lot of correlation between indices, because the differences between indices are generally significantly less than 256. A combination of the two is usually necessary since some parts of the images may have indices that are far from one another, and other parts of the images have strongly correlated indices.

Figure 10:
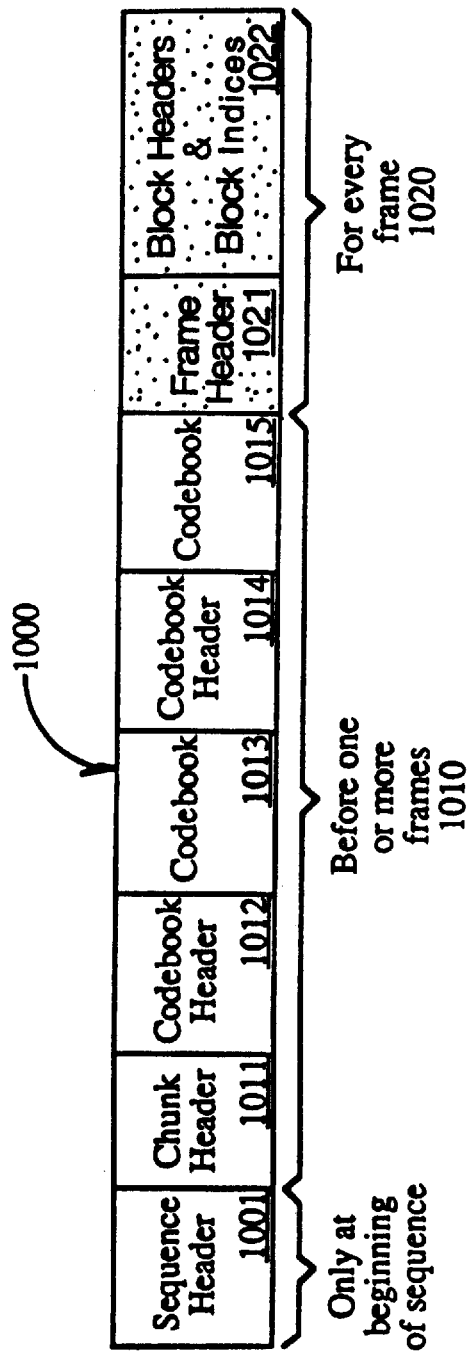
FIG. 10 shows a bitstream used by the preferred embodiment.

As shown with reference to FIG. 10, the bitstream syntax includes a sequence header 1001, chunk header 1011, frame headers 1021, and codebook headers 1012, 1014. These are followed by the codebook indices, which are delineated by block type headers which indicate what blocktype the following indices refer to. 2×2 change (2×2C), 2×2 no-change (2×2NC), 4×4 no-change (4×4NC), 4×4 change (4×4C), subsampled (4×4SS), different combinations of mixed blocks, and raw pixel blocks are examples of useful blocktypes. Decoder 351 can then reconstruct the image, knowing which codebook vector to use for each image block and whether or not to upsample. The bitstream syntax will now be discussed.

Sequence header 1001 conveys information associated with the entire sequence, such as the total number of frames, the version of the coder that the sequence was encoded with, and the image size. A sequence may comprise an entire movie, for example. A single sequence header 1001 precedes a sequence of images and specifies information about the sequence. Sequence header 1001 can be almost any length, and carries its length in one of its fields. Several fields currently defined for the sequence headers are shown in FIG. 11. Sequence header 1001 comprises a sequence header ID 1101 which allows the decoder to identify that it is at a sequence header. This is useful for applications which allow random access playback for the user. Further, sequence header 1001 comprises a length field 1102 which specifies how long the sequence header 1001 is. The next field in sequence header 1001 is number of frames field 1103 which defines the number of frames in the sequence. This is an integer value which is stored as an unsigned long word in the preferred embodiment allowing sequence lengths of up to $2^{32}$ frames. The next field 1104 in the sequence header is currently reserved, and the following two fields 1105 and 1106 define the width and height of the images in the sequence. The last field in sequence header 1001 is the version field 1107 which is an integer field defining the current version of the encoding/decoding apparatus being used. This is to distinguish newer sequences from older sequences which may have additional features or lack certain features. This will allow backward and upward compatibility of sequences and encoding/decoding schemes. The sequence header may also contain an ASCII or character string that can identify the sequence of images (not shown).

Returning to FIG. 10, Chunk header 1011 carries a chunk type which conveys information about the next chunk of frames, such as whether or not they use a shared codebook. The chunk header can also specify how many codebooks are used for that chunk of frames. Chunk header 1011 precedes a "chunk" of frames in the sequence. A chunk is one or more frames which is distinguishable from another "chunk" in the preferred embodiment by such apparatus as a scene change detector algorithm. In another embodiment, groups of frames may be associated using another technique, such as the rate control mechanism.

Two codebook headers are shown in the example sequence 1000 of FIG. 10 which allow the use of two codebooks per frame. An example of the use of two codebooks is the use of a fixed codebook (static for the "chunk" of frames) and an adaptive codebook (which changes for every frame). The codebook type and size are contained in codebook headers 1012 and 1014 as shown in FIG. 13*a*. Each codebook header, such as 1012 or 1014 shown in FIG. 10, contains a codebook type field 1301, which defines the codebook type—for example, whether it is fixed or adaptive. Codebook types include YUV (subsampled UV or non-subsampled UV), RGB, and YUV update codebooks. Other types are contemplated within the spirit and scope of the present invention. For an "update" codebook, the updates to the codebook are transmitted following the codebook header. The size of the codebook is specified in bytes in field 1302 so that the decoder can detect when the next field occurs. If the codebook type is an "update" codebook (i.e. to a shared codebook), then the information 1013 (or 1015) shown in FIG. 13*b* is expected immediately following the codebook header 1012 (or 1014). This update codebook will contain a bitmap 1370 which identifies those codebook entries which need to be updated. This field is followed by vector updates 1371–1373 for each of the vectors which is being updated. In this manner, instead of the entire codebook being regenerated, only selected portions are updated, resulting in a further reduction of the datarate. If YUV with U and V subsampled is used, each of the update vectors 1371–1373 comprise 6 bytes, four for luminance of each of the pixels in the block and one byte each for U and V. Updates of codebooks were discussed with reference to FIGS. 9*a* and 9*b* above.

In order to further reduce codebook overhead, codebooks such as 1013 and 1015 are transformed into YUV (luminance and chrominance) format, where U and V are subsampled by a factor of 2 in the vertical and horizontal directions (YUV 4:1:1). Thus, the codebooks are further reduced in size by transmitting subsampled UV information reducing the codebook size by a factor of 2.

As shown with reference to FIG. 12, frame header 1021 contains the image size again in width field 1201 and height field 1202, to allow for varying frames sizes over time. Frame header 1021 also contains a frame type field 1203, whose bit pattern indicates whether it is a null frame for skipped frames, an entirely subsampled frame, a keyframe, or a frame sharing a codebook with another frame. Other types of frames are contemplated within the spirit of the invention. The subsampled zone field 1204 is a 32-bit bitmap pattern which shows which zones, if any, are subsampled allowing for a maximum of 32 zones in the preferred embodiment.

Block headers shown in portion 1022 in FIG. 14 inform decoder 351 what type of block is associated with a set of indices, and how many indices are in the set. This is shown with reference to FIG. 14. The first 3 bits of header 1401 indicate whether the following set of indices are 2×2C blocks (change blocks), 4×4NC blocks (no-change blocks), 4×4SS blocks (subsampled blocks), mixed blocks, or raw pixel values. If the first three bits specify that the blocktype is not mixed, the last 5 bits of header 1401 is an integer indicating how many indices 1402 follow the block header 1401. This is called a "runlength" block header. The blockheader may also specify mixed blocks, such as a mix of 2×2C and 2×2NC blocks. In such a case, the 5 bits in the header reserved for length specifies how many 4×4s of mixed 2×2C and 2×2NC blocks are encoded. Alternatively, one of these 5 bits may instead be used to allow for more mix possibilities. A bitmap follows, padded to the nearest byte. In the 2×2C–2×2NC mix example, the bitmap specifies with a "1" that the blocktype is 2×2C, and with a "0" that the blocktype is 2×2NC. The blocks can be mixed on a 4×4 granularity as well. It is simple to calculate if the bitmap header will reduce the number of bits over a runlength header. A sequence of alternating blocktypes like "10010110101" would be coded well with a bitmap blockheader, whereas long runs of one header type (e.g. "111111111000000000") would be better coded with the runlength header type. The blockheader that codes the blocks more efficiently is chosen. The bitmap leader allows the efficient coding of short run blocks which can occur frequently.

Because of the overhead of two bytes of a block type header 1401 before and after a block which is tagged as a "no-change" block in the middle of a stream of "change" blocks, the runlength blockheaders in the preferred embodiment only disturbs the structure of the indices with headers if there at least 4 2×2 no-change blocks in a row. The runlength headers in the preferred embodiment requires that 4-2×2NC (no-change) blocks must occur together to make a 4×4NC (no-change) block, in order to distinguish them in the bitstream with headers such as 1410. A block header such as 1410 which indicates that the following N blocks are of the 4×4NC (no-change) type need not waste any bytes with indices since the previous frame's blocks in the same location are going to be used instead. Decoder 351 only needs to know how many blocks to skip over for the new image. 2×2C blocks indices such as 1402 do not need to occur in sets of 4 because actual pixel values may be used or even singular 2×2 blocks. If actual pixel values or singular 2×2C and 2×2NC blocks are not supported in some implementations, assuming 2×2C blocks occur in fours can increase, the number of blocks associated with the 2×2C blockheader such as 1401, and consequently decrease the effective overhead due to the blockheader. For example, a block may identify eight 2×2C (change) blocks and interpret that as meaning eight groups of 4 2×2C blocks, if singular 2×2 blocks are not supported. (See an example of this in FIGS. 15, 16 where 2-2×2C blocks are interpreted as two sets of 4-2×2C blocks).

Additionally, the indices 1402 in FIG. 14 referring to the 2×2C blocks do not have to be from the same codebook as the indices 1421 referring to the 4×4SS blocks. This bitstream flexibility allows the support of higher quality at very little reduction in compression by having more than 256 codebook vectors without having to jump to a non-byte aligned index size (such as an unwieldy 9 bits for 512 codebook vectors).

INDEX PACKING

If image blocks are in close proximity in the codebook and are also similar in RGB color space, it is advantageous to use a base address when coding the indices, instead of just listing them in the bitstream. Because the codebook vectors are generated by splitting "worst error" nodes, similar image vectors tend to be close together in the codebook. Because like image blocks tend to occur together in space in the image (i.e. there is spatial correlation among the blocks), index values that are close together tend to occur together. Assignment of codebook indices can also be performed in such a way that differences in indices over space can be minimized. An example of how this may be used to reduce the number of bits losslessly is shown and discussed with reference to FIGS. 15 and 16. This packing process is performed by 340 in encoder 301 shown in FIG. 3, and unpacking is performed by process 370 in decoder 351.

Figures 15, 16:
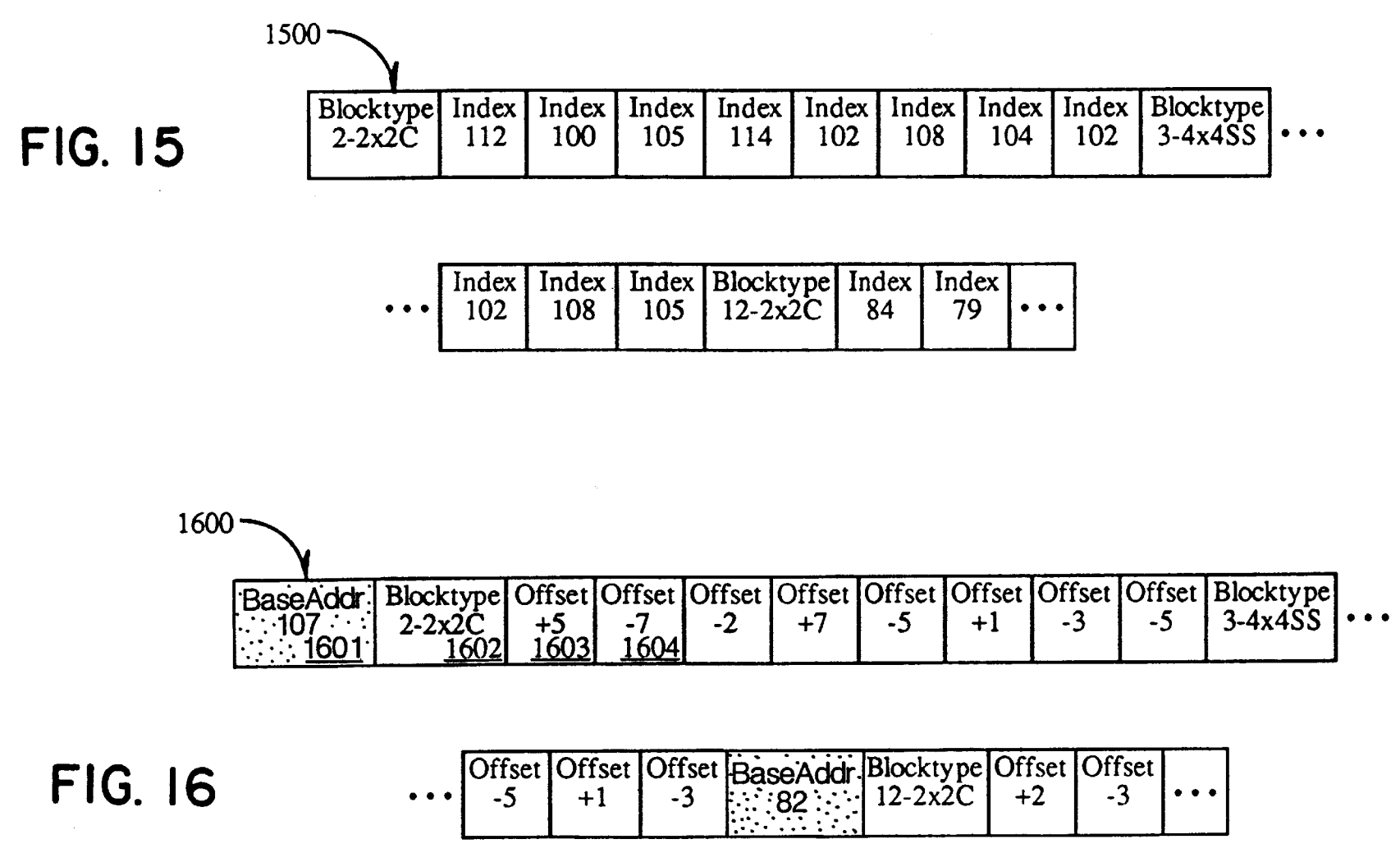

In FIG. 15, the codebook indices in bitstream 1500 each require 8 bits if the codebook has 256 entries. In other words, each index comprises a complete reference to an element of the codebook. As discussed above, due to spatial correlation, these index values can be reduced further by using offsets from a base address. This is shown in FIG. 16. In FIG. 16, the codebook indices each require only 4 bits if indices are represented as offsets as being from −8 to +7 from a transmitted base address. This is shown as 1601 in bitstream 1600. Base address 1601 is used as the starting point, and the offset value of a current block such as 1604 can refer to the change in the index just preceding the current block 1603. The base address header 1601 is required to be transmitted defining the base address, and that differential coding is being used. Regions which have a large, variable set of codebook indices (from one end of the codebook to the other), are more efficiently coded using the transmission of complete indices such as shown in FIG. 15, and regions which are similar on a block level are more efficiently coded using a bitstream such as 1600 shown in FIG. 16. Using offsets from a base address, as is shown in FIG. 16, is equally lossless as the technique shown in FIG. 15 since the original index values can be calculated by adding offsets to the base address.

Thus, an invention for compressing and decompressing video data has been described. In the foregoing specification, the present invention has been described with reference to specific embodiments thereof in FIGS. 1 through 16. It will, however, be evident that various modifications and changes may be made thereto without departing from the broader spirit and scope of the present invention as set forth in the appended claims. The specification and drawings are, accordingly, to be regarded in an illustrative rather than a restrictive sense.

What is claimed is:

1. An apparatus for encoding an image represented by a plurality of blocks of pixels, said apparatus comprising:
   a preprocessor configured to select a portion of the plurality of blocks to subsample by calculating values indicative of distortion caused by subsampling the plurality of blocks;
   the preprocessor being further configured to subsample the portion of the plurality of blocks into subsampled blocks to reduce the amount of data that must be encoded to encode the image; and
   an encoder configured to receive the subsampled blocks from said preprocessor and non-subsampled blocks, said encoder being further configured to encode the subsampled blocks and the non-subsampled blocks with separate codebooks.

2. The apparatus of claim 1 wherein each of the values indicative of distortion is associated with a respective one of the plurality of blocks, and said preprocessor is configured to subsample blocks of the plurality of blocks having values indicative of small distortion relative to other of the plurality of blocks.

3. The apparatus of claim 1 wherein said encoder is further configured to indicate that the subsampled blocks have been encoded with a first codebook and that the non-subsampled blocks have been encoded with a second codebook.

4. An apparatus for encoding an image represented by a plurality of blocks of pixels, said apparatus comprising:
   a preprocessor configured to subsample a portion of the plurality of blocks into subsampled blocks to reduce the amount of data that must be encoded to encode the image;
   an encoder configured to receive the subsampled blocks from said preprocessor and non-subsampled blocks, said encoder being further configured to encode the subsampled blocks and the non-subsampled blocks with separate codebooks; and
   a rate controller configured to limit the number of subsampled blocks according to a desired bit-rate.

5. The apparatus of claim 1 wherein the portion of the plurality of blocks subsampled into subsampled blocks is spatially smoother than the non-subsampled blocks.

6. The apparatus of claim 1 wherein said encoder comprises a vector quantizer.

7. The apparatus of claim 1 wherein at least one of the separate codebooks is used to encode a plurality of images.

8. An apparatus for encoding an image, said apparatus comprising:
   means for encoding each of a plurality of regions of an image with a respective one of a first plurality of codebooks;
   means for generating an error value indicating a measure of distortion resulting from encoding at least one of the plurality of regions with one of the first plurality of codebooks;
   means for dividing the at least one of the plurality of regions into subregions based on the error value; and
   means for encoding each of the subregions with a respective one of a second plurality of codebooks.

9. The apparatus of claim 8 wherein said error value is based on a difference between the magnitude of a codebook vector used to encode a first vector in the at least one of the plurality of regions and the magnitude of the first vector.

10. The apparatus of claim 8 wherein said means for dividing at least one of the plurality of regions into subregions comprises means for dividing at least one of the subregions into additional subregions based on an error value associated with encoding the at least one of the subregions.

11. The apparatus of claim 8 wherein said error value comprises a mean-squared error.

12. The apparatus of claim 8 wherein said means for dividing comprises means for recursively dividing the plurality of regions into subregions until a predetermined number of regions is reached.

13. The apparatus of claim 8 wherein two or more codebooks of the first plurality of codebooks contain different quantities of codebook vectors.

14. An apparatus for encoding a current image comprising:
   means for using a previous codebook from a previous image to encode said current image as a first encoded image;
   means for decoding said first encoded image to generate a first decoded image;
   means for comparing said current image to said first decoded image to produce an error value;
   means for updating said previous codebook to create a current codebook for said current image if said error value exceeds a threshold, said threshold being based on an error between a second decoded image generated from a previous encoded image and a previous unencoded image; and
   means for encoding said current image as a second encoded image using said current codebook if said error value exceeds said threshold.

15. The apparatus of claim 14 wherein said threshold is based on an average of frame mean squared errors.

16. The apparatus of claim 14 wherein said updating means comprises a means for updating specific entries in said previous codebook to generate said current codebook if decoded vectors generated from said first encoded image have a large error in comparison with said current image.

17. The apparatus of claim 16 wherein said updating means further comprises a means for generating a new codebook to be used as said current codebook if said decoded vectors generated from said first encoded image have a large mean squared error in comparison with said current image and said means for updating entries in said previous codebook has already been operative.

18. An apparatus for encoding a current image comprising:
   means for using a previous codebook from a previous image to encode said current image as a first encoded image;
   means for decoding said first encoded image to generate a first decoded image;
   means for comparing said current image to said first decoded image to produce an error value;
   means for updating said previous codebook to create a current codebook for said current image if said error value exceeds a threshold; and
   means for encoding said current image as a second encoded image using said current codebook if said error value exceeds said threshold
   wherein said updating means comprises a means for updating specific entries in said previous codebook to generate said current codebook if decoded vectors generated from said first encoded image have a large error in comparison with said current image;
   wherein said updating means further comprises a means for generating a new codebook to be used as said current codebook if said decoded vectors generated from said first encoded image have a large mean squared error in comparison with said current image and said means for updating entries in said previous codebook has already been operative; and
   wherein said new codebook generation means is activated if said updating means has been operative for encoding at least N images sequentially.

19. The apparatus of claim 14 wherein said updating means comprises a means for traversing nodes in a tree representative of vectors for said previous codebook and determining best entries in said previous codebook to use in said current codebook.

20. The apparatus of claim 19 further comprising a means for removing entries in said tree which have a worst error compared with vectors in said current image.

21. The apparatus of claim 19 wherein said means for determining best entries in said tree comprises a means for determining the mean squared error between vectors in said current image and vectors in said tree.

22. The apparatus of claim 19 further comprising a means for creating additional entries in said tree to better represent said current image.

23. The apparatus of claim 22 wherein said means for creating additional entries comprises splitting nodes in said tree to create two new entries for said current codebook.

24. An apparatus for encoding a current image comprising:
   means for using a previous codebook from a previous image to encode said current image as a first encoded image;
   means for decoding said first encoded image to generate a first decoded image;
   means for comparing said current image to said first decoded image to produce an error value;
   means for updating said previous codebook to create a current codebook for said current image if said error value exceeds a threshold; and
   means for encoding said current image as a second encoded image using said current codebook if said error value exceeds said threshold;
   wherein said updating means comprises a means for traversing nodes in a tree representative of vectors for said previous codebook and determining best entries in said previous codebook to use in said current codebook;
   means for creating additional entries in said tree to better represent said current image;
   wherein said means for creating additional entries comprises splitting nodes in said tree to create two new entries for said current codebook; and
   wherein said means for splitting nodes in said tree is operative upon determining that said nodes have a greater population of vectors from the current image associated with them than a population threshold.

25. An apparatus for encoding a current image comprising:
   means for using a previous codebook from a previous image to encode said current image as a first encoded image;

means for decoding said first encoded image to generate a first decoded image;

means for comparing said current image to said first decoded image to produce an error value;

means for updating said previous codebook to create a current codebook for said current image if said error value exceeds a threshold; and means for encoding said current image as a second encoded image using said current codebook if said error value exceeds said threshold;

wherein said updating means comprises a means for traversing nodes in a tree representative of vectors for said previous codebook and determining best entries in said previous codebook to use in said current codebook;

means for creating additional entries in said tree to better represent said current image;

wherein said means for creating additional entries comprises splitting nodes in said tree to create two new entries for said current codebook; and wherein said means for splitting nodes in said tree is operative upon determining that said nodes have a greater distortion of vectors than a distortion threshold.

26. The apparatus of claim 20 further comprising a means for removing an entry in said tree which has no vectors from the current image associated with it.

27. An apparatus for encoding N images comprising:

means for encoding N images into N encoded images using a first codebook generated from n images, wherein n is greater than or equal to one and n is less than or equal to N;

means for determining based on an error between one of said N images and a decoded one of said N encoded images that a second codebook should be used by said means for encoding instead of said first codebook;

means for determining whether a first number of blocks for said N encoded images having an error greater than an average block error is greater than a threshold; and means for generating a second codebook for encoding an image encoded subsequent to said N images.

28. The apparatus of claim 27 wherein said means for determining comprises means for replacing said first codebook with said second codebook.

29. The apparatus of claim 27 wherein said means for determining comprises means for updating said first codebook to generate said second codebook.

30. The apparatus of claim 27 wherein said determining means comprises a means for determining whether the error between said one of said N images and said decoded one of said N encoded images exceeds a threshold.

31. An apparatus for encoding N images comprising:

means for encoding N images into N encoded images using a first codebook generated from n images, wherein n is greater than or equal to one and n is less than or equal to N;

means for determining based on an error between one of said N images and a decoded one of said N encoded images that a second codebook should be used by said means for encoding instead of said first codebook;

filtering means for filtering said N images prior to said encoding means encoding said N images; and rate control means for controlling said filtering means to generate an encoded bitstream at a desired rate.

32. The apparatus of claim 31 wherein said rate control means determines a desired frame length for a current one of said N images based on the extent to which an actual frame length for a previous one of said N images differed from a desired frame length determined for the previous one of said N images.

33. The apparatus of claim 31 wherein said filtering means comprises a low pass filter.

34. The apparatus of claim 27 further comprising means for updating said first codebook to create said second codebook, said means for updating comprising means for computing blocks from said N images to update entries in said first codebook.

35. The apparatus of claim 34 further comprising means for determining whether an image decoded with said second codebook has a frame error greater than a threshold.

36. The apparatus of claim 35 further comprising means for generating a replacement codebook if said image decoded with said second codebook has a frame error greater than said threshold.

37. A method of encoding a sequence of images comprising:

generating a first codebook based on vectors obtained from an initial image of said sequence of images;

encoding a subsequent image of said sequence of images into a subsequent encoded image using said first codebook;

decoding said subsequent encoded image into a subsequent decoded image using said first codebook;

determining whether a current frame error between said subsequent decoded image and said subsequent image is greater than a previous frame error between a decoded initial image and said initial image; and if said current frame error is greater than said previous frame error, generating a second codebook based on said subsequent image and encoding said subsequent image using said second codebook.

38. The method of claim 37 further comprising the steps of:

determining that a number of decoded blocks in said subsequent decoded image differ from corresponding blocks in said subsequent image by at least a threshold amount;

determining whether said number of decoded blocks exceeds a threshold number; and if said number of decoded blocks exceeds the threshold number, generating a third codebook based on said subsequent image and encoding said subsequent image using said second codebook.

39. The method of claim 37 wherein said step of generating a second codebook comprises:

identifying a first codebook vector in said first codebook which is least representative of said subsequent image;

removing said first codebook vector from said first codebook;

adding a second codebook vector to said first codebook to generate a second codebook, said second codebook vector being based on said subsequent image; and encoding said subsequent image with said second codebook.

40. The method of claim 39 wherein said step of adding a second codebook vector to said first codebook to generate a second codebook comprises the step of associating said second codebook vector with a terminal node of a tree structure.

41. The method of claim 37 wherein said step of generating a second codebook comprises the step of associating vectors with terminal nodes of a tree structure, said vectors being based on said subsequent image.

42. The method of claim 41 further comprising the steps of:

determining that one of said terminal nodes of said tree structure has no vectors associated with it; and removing said one of said terminal nodes from said tree structure.

43. The method of claim 41 further comprising the steps of:

determining one of said terminal nodes of said tree structure to have a distortion measure greater than distortion measures of other of said terminal nodes of said tree structure;

splitting said one of said terminal nodes into a parent node having child nodes;

associating vectors associated with said one of said terminal nodes with said child nodes.

44. The method of claim 39 wherein said step of adding a second codebook vector to said first codebook to generate a second codebook comprises the steps of:

transmitting said second codebook vector to a decoding means; and updating a third codebook in said decoding means.

45. A method for transmitting an image, the method comprising:

separating the image into smooth regions and detailed regions based upon a comparison between pixels and neighboring pixels in the image;

encoding the smooth regions of the image with a first codebook;

encoding the detailed regions of the image with a second codebook; and wherein said step of separating the image into smooth regions and detailed regions comprises the step of calculating, for each one of a plurality of blocks of pixels comprised by the image, an error value indicative of distortion that would result if the one of the plurality of pixel blocks was subsampled, the smooth regions being defined by pixel blocks having lower error values than pixel blocks defining the detailed regions.

46. The method of claim 43 further comprising the step of subsampling the smooth regions prior to said step of encoding the smooth regions with the first codebook.

47. A method for encoding images, the method comprising the steps of:

generating a first codebook based on a first input image;

encoding a second input image with the first codebook to generate a second encoded image;

decoding said second encoded image to generate a second decoded image;

determining whether a difference between the second decoded image and the second input image exceeds a threshold;

updating the first codebook to generate a second codebook if the difference exceeds the threshold; and wherein said step of determining whether a difference between the second decoded image and the second input image exceeds a threshold comprises the step of determining a threshold based on a difference between a previous input image and a previous decoded image.

48. The method of claim 47 wherein said step of updating the first codebook to generate a second codebook comprises the step of removing a vector from said first codebook.

49. The method of claim 47 wherein said step of updating the first codebook to generate a second codebook comprises the step of adding a vector to said first codebook.

50. A method for encoding images, the method comprising the steps of:

generating a first codebook based on a first input image;

encoding a second input image with the first codebook to generate a second encoded image;

decoding said second encoded image to generate a second decoded image;

determining whether a difference between the second decoded image and the second input image exceeds a threshold;

updating the first codebook to generate a second codebook if the difference exceeds the threshold; and wherein said step of updating the first codebook to generate a second codebook comprises the step of traversing nodes in a tree to locate a terminal node of the tree having a larger distortion measure than other terminal nodes of the tree.

51. The method of claim 50 further comprising the steps of:

converting the terminal node of the tree into a parent node having a plurality of child nodes; and assigning a plurality of vectors to be representative vectors for the plurality of child nodes.

52. An apparatus for encoding an image comprising:

a preprocessor configured to receive the image and to indicate whether a difference between a first region of the image and a second region of the image exceeds a threshold;

a vector quantizer coupled to said preprocessor and receiving therefrom the first region, the second region and an indication whether the difference exceeds a threshold, said vector quantizer being configured to encode the first region of the image with a first codebook into a first data sequence and, if the difference exceeds the threshold, to encode the second region with a second codebook into a second data sequence;

a packer coupled to said vector quantizer and receiving the first data sequence and, if the difference exceeds a threshold, the second data sequence therefrom, said packer being configured to generate a datastream containing the first data sequence and, if the difference exceeds the threshold, the second data sequence; and said packer being further configured to place information in the datastream indicating that the first data sequence is encoded with the first codebook and, if the difference exceeds the threshold, that the second data sequence is encoded with the second codebook.

53. An apparatus for decoding an encoded image, said apparatus comprising:

a receiving unit configured to receive a datastream including a first codebook index, a second codebook index and information indicating for each of the first codebook index and the second codebook index whether a subsampled block-type or a non-subsampled block-type is represented;

an unpacker coupled to said receiving unit and receiving the datastream therefrom, said unpacker being configured to detect the information indicating whether a subsampled block-type or a non-subsampled block-type is represented and to decode each one of the first codebook index and the second codebook index using either a first codebook or a second codebook according to whether the one of the first codebook index and the second codebook index represents a subsampled block-type or a non-subsampled block-type.

54. The apparatus of claim 53 wherein said receiving unit comprises a codebook regenerator and the datastream further includes codebook vectors, said codebook regenerator being configured to generate the first and second codebooks from the codebook vectors.

55. The method of claim 47 further comprising the step of encoding the second input image with the second codebook if the difference exceeds the threshold.

56. A method for encoding an image represented by a plurality of blocks of pixels, said method comprising:

subsampling a portion of the plurality of blocks into subsampled blocks to reduce the amount of data that must be encoded to encode the image;

encoding the subsampled blocks with a first codebook;

encoding non-subsampled blocks with a second codebook; and wherein said step of subsampling a portion of the plurality of blocks includes the step of selecting the portion of the plurality of blocks to subsample by calculating values indicative of distortion expected from subsampling the plurality of blocks.

57. A method for encoding an image, said method comprising:

encoding each of a plurality of regions of an image with a respective one of a first plurality of codebooks;

dividing at least one of the plurality of regions into subregions based on an error value associated with encoding the at least one of the plurality of regions; and encoding each of the subregions with a respective one of a second plurality of codebooks.

58. The method of claim 57 wherein said step of dividing at least one of the plurality of regions into subregions comprises the step of dividing at least one of the subregions into additional subregions based on an error value associated with encoding the at least one of the subregions.

* * * * *